US010936262B2

(12) United States Patent
Yoshimura

(10) Patent No.: US 10,936,262 B2
(45) Date of Patent: Mar. 2, 2021

(54) IMAGE FORMING APPARATUS, A NON-TRANSITORY COMPUTER-READABLE RECORDING MEDIUM STORING CONTROL PROGRAM, AND CONTROL METHOD FOR ALERTING DETECTION OF INTRUDER

(71) Applicant: SHARP KABUSHIKI KAISHA, Sakai (JP)

(72) Inventor: Sohichi Yoshimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/595,898

(22) Filed: Oct. 8, 2019

(65) Prior Publication Data

US 2020/0117407 A1  Apr. 16, 2020

(30) Foreign Application Priority Data

Oct. 11, 2018  (JP) .............................. JP2018-192309

(51) Int. Cl.
*G06F 3/12* (2006.01)
*B41J 29/58* (2006.01)
*G06F 3/16* (2006.01)

(52) U.S. Cl.
CPC ............ *G06F 3/1239* (2013.01); *B41J 29/58* (2013.01); *G06F 3/1222* (2013.01); *G06F 3/16* (2013.01)

(58) Field of Classification Search
CPC ....................................................... G06F 3/1239
USPC ........................................................ 358/1.14
See application file for complete search history.

(56) References Cited

U.S. PATENT DOCUMENTS

| 2010/0037285 | A1* | 2/2010 | Cain ..................... G06F 3/1219 726/1 |
| 2018/0314468 | A1* | 11/2018 | Osadchyy ............. G06F 3/1285 |
| 2019/0034131 | A1* | 1/2019 | Crisolo ................. G06F 3/1239 |
| 2019/0166263 | A1* | 5/2019 | Furusawa .......... H04N 1/00488 |

FOREIGN PATENT DOCUMENTS

JP         2015-133028 A       7/2015

* cited by examiner

*Primary Examiner* — Jacky X Zheng
(74) *Attorney, Agent, or Firm* — ScienBiziP, P.C.

(57) ABSTRACT

An image forming apparatus includes a main CPU 70. During an unused period in which the image forming apparatus is not used, the main CPU 70 detects, based on the output of a first operation detection sensor, the presence of a first operation, which is an operation that causes a concern that consumable items or the like may be stolen. When the main CPU 70 detects the first operation, theft alert audio which indicates that there is a concern that consumable items or the like may be stolen is output from a speaker. Also, the main CPU 70 transmits an email to a pre-registered destination which includes a theft alert message, which indicates that there is a concern that consumable items or the like may be stolen.

5 Claims, 14 Drawing Sheets

IMAGE FORMING APPARATUS, A NON-TRANSITORY COMPUTER-READABLE RECORDING MEDIUM STORING CONTROL PROGRAM, AND CONTROL METHOD FOR ALERTING DETECTION OF INTRUDER

BACKGROUND

The present invention relates to an image forming apparatus, a non-transitory computer-readable recording medium storing a control program, and a control method. In particular, the present invention relates to an image forming apparatus, a non-transitory computer-readable recording medium storing a control program, and a control method that alert, for example, that an intruder was detected.

Japanese Laid-Open Patent Application Publication No. 2015-133028 discloses an example of an image forming apparatus of the background art. Japanese Laid-Open Patent Application Publication No. 2015-133028 discloses a configuration of an image forming apparatus, which includes: an imaging device that captures a prescribed monitored area; a human detection device that detects a person in a state where the supplied electric power is lower than the electric power required to drive the image forming apparatus; a transmission device that transmits the image data captured by the imaging device to the outside; a control device that controls the imaging device and the transmission device; and a switching device that selectively switches between a first standby mode, which causes the imaging device to capture the monitored area if the human detection device detects a person, and a second standby mode, which causes the imaging device to capture the monitored area irrespective of the output of the human detection device.

Furthermore, in the second standby mode, the presence of a person in the monitored area is determined based on image data captured by the imaging device. In the second standby mode, if it is determined that a person exists in the monitored area, the image from the imaging device (image data) is compared with image data which has been accumulated in advance. Then, by executing facial recognition processing with respect to the person, it is determined whether or not the person corresponds to a pre-registered person. If the result of the comparison results in more than a prescribed difference, the image data captured by the imaging device is transmitted to the outside.

However, even though the image forming apparatus of the background art is capable of detecting the intrusion of a suspicious person into the monitored area, there is a problem that the consumable items used by the image forming apparatus or the various devices attached to the image forming apparatus cannot be prevented from being stolen.

Therefore, the present invention is directed to provide a new image forming apparatus, a non-transitory computer-readable recording medium storing control program, and control method.

The present invention is also directed to provide an image forming apparatus, a non-transitory computer-readable recording medium storing a control program, and a control method which are capable of deterring or preventing the consumable items used by the image forming apparatus or the various devices attached to the image forming apparatus from being stolen.

SUMMARY

A first aspect of the present invention is an image forming apparatus including period setting device, an operation detection device, and an alert device. The period setting device sets an unused period in which the image forming apparatus used. The operation detection device detects a predetermined operation that removes, from the image forming apparatus, a consumable item used by the image forming apparatus. The alert device alerts that the predetermined operation was detected when the predetermined operation is detected by the operation detection device during the unused period set by the period setting device.

A second aspect of the present invention is the image forming apparatus according to the first aspect of the invention, wherein the alert device alerts the surroundings of the image forming apparatus that the predetermined operation was detected, by audio.

A third aspect of the present invention is the image forming apparatus according to the first or the second aspect of the present invention, further including a lock mechanism which prevents the consumable item used by the image forming apparatus from being removed during the unused period set by the period setting device.

A fourth aspect of the present invention is an image forming apparatus including a period setting device, an operation detection device, and an alert device. The period setting device sets an unused period in which the image forming apparatus of used. The operation detection device detects a predetermined operation that detaches, from the image forming apparatus, a unit which is capable of being installed to the image forming apparatus, or an additional device which is capable of being installed to the image forming apparatus. The alert device alerts that the predetermined operation was detected when the predetermined operation is detected by the operation detection device during the unused period set by the period setting device.

A fifth aspect of the present invention is the image forming apparatus according to the fourth aspect of the present invention, wherein the alert device means alerts the surroundings of the image forming apparatus that the predetermined operation was detected, by audio.

A sixth aspect of the present invention is the image forming apparatus according to the fourth or the fifth invention, further including a lock mechanism that prevents a unit or additional device from being detached during the unused period set by the period setting means.

A seventh aspect of the present invention is an image forming apparatus including a period setting device and a lock mechanism. The period setting means sets an unused period in which the image forming apparatus is not used. The lock mechanism prevents a consumable item used by the image forming apparatus, a unit which is capable of being installed to the image forming apparatus, or additional device which is capable of being installed to the image forming apparatus, from being detached during the unused period set by the period setting device.

An eighth aspect of the present invention is a non-transitory computer-readable recording medium storing a control program executed by an image forming apparatus, the control program causing a processor of the image forming apparatus to execute setting an unused period in which the image forming apparatus is not used; detecting a predetermined operation that removes, from the image forming apparatus, a consumable item used by the image forming apparatus; and alerting that the predetermined operation was detected when the predetermined operation is detected during the set unused period.

A ninth aspect of the present invention is a control method including: (a) setting an unused period in which an image forming apparatus is not used; (b) detecting a predetermined operation that removes, from the image forming apparatus, a consumable item used by the image forming apparatus; and (c) alerting that the predetermined operation was detected when the predetermined operation is detected in (b) during the unused period set in (a).

A tenth aspect of the present invention is a non-transitory computer-readable recording medium storing a control program executed by an image forming apparatus, the control program causing a processor of the image forming apparatus to execute: setting an unused period in which the image forming apparatus is not used; detecting a predetermined operation that removes, from the image forming apparatus, a unit which is capable of being installed to the image forming apparatus, or an additional device which is capable of being installed to the image forming apparatus; and alerting that the predetermined operation was detected when the predetermined operation is detected during the set unused period.

An eleventh aspect of the present invention is a control method including: (a) setting an unused period in which an image forming apparatus is not used; (b) detecting a predetermined operation that detaches, from the image forming apparatus, a unit which is capable of being installed to the image forming apparatus, or an additional device which is capable of being installed to the image forming apparatus; and (c) alerting that the predetermined operation was detected when the predetermined operation is detected in (b) during the unused period set in (a).

According to the present invention, it is possible to deter or prevent consumable items used by an image forming apparatus, or various devices attached to an image forming apparatus from being stolen.

The object above, other objects, features and advantages of the present invention will become more apparent from the detailed description of the following embodiments given with reference to the drawings.

DETAILED DESCRIPTION

First Embodiment

Figure 1:
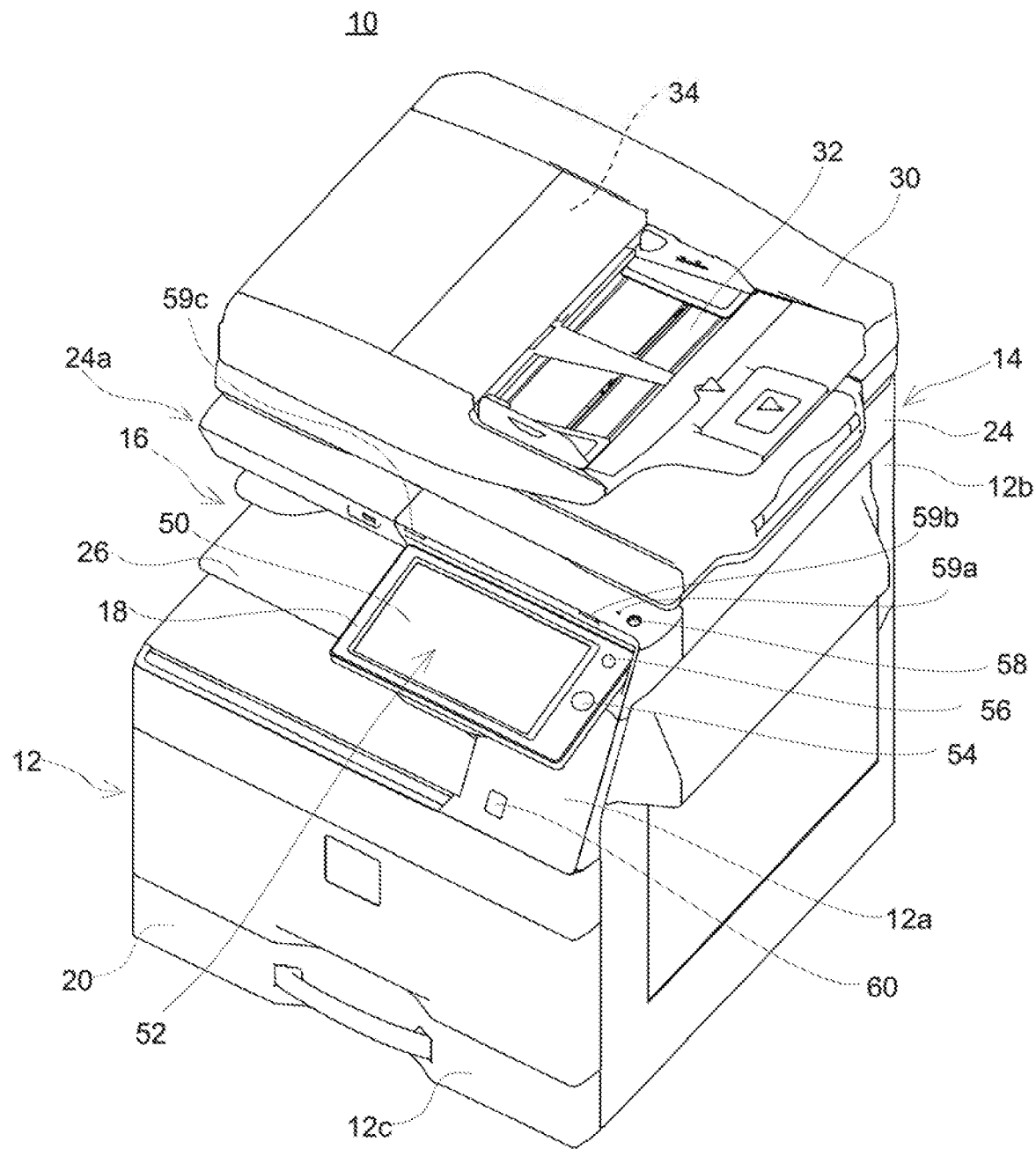
FIG. 1 is a perspective view showing an example of an external configuration of an image forming apparatus according to an embodiment of the present invention, as viewed diagonally from above.

FIG. 1 is a perspective view showing an example of an external configuration of an image forming apparatus 10 according to an embodiment, as viewed diagonally from above. Referring to FIG. 1, the image forming apparatus 10 according to an embodiment of the present invention is an internal discharge-type image forming apparatus having an internal discharge unit 16 formed between an image forming unit 12 and an image reader 14, and which includes an operation unit 18 provided as a separate unit on the front surface side of the image reader 14. As described below, the image forming apparatus 10 forms a multicolor or single-color image on a predetermined paper sheet (recording medium) based on image data read by the image reader 14, and discharges the paper sheet to the internal discharge unit 16 after image formation. In the present embodiment, the image forming apparatus 10 is a multifunction peripheral (MFP) which includes a copy function, a printer function, a scanner function, a facsimile function, and the like.

In the present embodiment, the front-and-rear direction (depth direction) of the image forming apparatus 10 and constituent members thereof is defined such that the surface facing the user's standing position, that is to say, the surface on the side provided with the operation unit 18, is the front surface (main surface). Further, the left-and-right direction (width direction) of the image forming apparatus 10 and constituent elements thereof is defined based on the user's view of the image forming apparatus 10.

First, the basic configuration of the image forming apparatus 10 will be described. As shown in FIG. 1, the image forming apparatus 10 includes an image forming unit 12, and an image reader 14 provided above the image forming unit 12.

The casing of the image forming unit 12 includes a first joined casing 12a formed on the upper-right side, and a second joined casing 12b formed on the upper-rear side. The image reader 14 is supported by the first joined casing 12a and the second joined casing 12b. As a result, the internal discharge unit 16, which is an internal space that accommodates a paper sheet after image formation, is formed on the lower surface side of the image reader 14.

An opening and closing cover 12c is provided in the casing of the image forming unit 12. The opening and closing cover 12c is provided on a front surface of the casing of the image forming unit 12 and is capable of being opened and closed. The opening and closing cover 12c is provided covering the front surface side of the components of the image forming unit 12 when closed. Furthermore, the components of the image forming unit 12 are exposed to the outside while the opening and closing cover 12c is opened.

The image forming unit 12 includes an exposure unit, a developer, a photosensitive drum, a charger, an intermediate transfer belt, a transfer roller, a fixing unit, and the like. The image forming unit 12 forms an image on a paper sheet transported from a paper sheet feeding cassette 20 or the like disposed therebelow by an electrophotographic method. That is to say, the image forming unit 12 forms an electrostatic latent image on the photosensitive drum corresponding to the image data by means of the charger, the exposure unit, and the like, and the developer visualizes the electrostatic latent image on the photosensitive drum with toner. Furthermore, the toner image formed on the photosensitive drum is transferred to a paper sheet by the intermediate transfer belt, the transfer roller, and the like, and the fixing unit fixes the toner image transferred to the paper sheet using heat. Then, the paper sheet after image formation is discharged to the internal discharge unit 16 from a paper outlet (not shown) formed in the first joined casing 12a. The image data for forming the image on the paper sheet represents image data read by the image reader 14, image data transmitted from an external computer, or the like.

Although a detailed description is omitted, the image forming unit 12 includes a color print function, and therefore, four photosensitive drums, four chargers, four developers, four transfer rollers, four cleaning devices, and the like are provided that correspond to each of the colors Y (yellow), M (magenta), C (cyan), and K (black). Furthermore, an image forming station including a photosensitive drum, a charger, a developer, a transfer roller, and a cleaning device is configured for each color. For example, the image forming apparatus 10 is a tandem-type image forming apparatus in which image forming stations for each color are disposed side-by-side in the image forming unit 12.

The image reader 14 includes a casing 24 having a document placement table on the upper surface which is formed of a transparent material. A light source, a plurality of mirrors, an imaging lens, a line sensor, and the like, are provided inside the casing 24. The image reader 14 exposes the surface of the document with the light source, and guides the reflected light from the surface of the document to the imaging lens by means of the plurality of mirrors. Then, the reflected light is imaged on a light-receiving element of the line sensor by means of the imaging lens. The line sensor detects the luminance and the chromaticity of the reflected light imaged on the light-receiving element, and generates image data based on the image on the document surface. A charge coupled device (CCD), a contact image sensor (CIS), or the like is used as the line sensor.

The bottom surface and the top surface of the internal discharge unit 16 are divided by the casing of the image forming unit 12 and the casing 24 of the image reader 14, and the right side surface and the rear surface are divided by the first joined casing 12a and the second joined casing 12b. That is to say, the front surface side and the left surface side of the internal discharge unit 16 are open. Furthermore, the internal discharge unit 16 is provided with a paper discharge tray 26 that receives paper sheets discharged from the paper outlet after image formation.

Moreover, a document holding cover 30 is attached to the upper surface of the image reader 14, and is capable of being freely opened and closed via a hinge or the like disposed on the rear side. The document holding cover 30 is provided with an automatic document feeder (ADF) 34 that automatically feeds documents placed on a document placement tray 32 one sheet at a time to an image reading position of the image reader 14.

Further, the casing 24 of the image reader 14 includes a casing protrusion 24a that protrudes forward of the front surface of the document holding cover 30. That is to say, the front end portion of the casing 24 protrudes forward of the front surface of the document holding cover 30. Also, the operation unit 18 is provided on the front surface side of the casing 24 of the image reader 14. A power button 58 is provided on the upper surface of the casing protrusion 24a (casing 24) toward the right end of the casing 24. In the present embodiment, when the image forming apparatus 10 is viewed from the front, the power button 58 is disposed in a position that lies on a straight line with a home button 54 and a power saving key 56 described below. Furthermore, the power button 58 is a push button-type hardware key, and is a button for turning on/off the main power of the image forming apparatus 10.

Furthermore, a light emitting diode (LED) 59a is provided on the left side of the power button 58. In addition, an LED 59b is provided on the front surface of the casing protrusion 24a toward the right end of the casing 24. An LED 59c is provided on a central portion of the casing 24.

The LED 59a is provided for alerting the on/off of the power button 58, that is to say, the on/off of the main power of the image forming apparatus 10. The LED 59a is turned on when the main power of the image forming apparatus 10 is on. The LED 59a is turned off when the main power of the image forming apparatus 10 is off.

The LED 59b is provided for alerting that a malfunction (error) has occurred, such as a paper shortage, a toner shortage, or a paper jam. The LED 59b is turned on when an error has occurred. The LED 59b is turned off when an error has not occurred.

The LED 59c is provided to alert that a fax has been received. The LED 59c is turned on when a fax is received and remains turned on until the paper sheet on which the received content is printed is removed. The LED 59c is turned off at all other times. However, if the received content is stored in an HDD 88 (see FIG. 2) without being printed, then the LED 59c is turned off after the fax is received, or after the fax is stored in the HDD 88.

Further, a human detection sensor 60 is provided on the front surface of the first joined casing 12a. The human detection sensor 60 uses a pyroelectric sensor (infrared sensor), and is capable of using a human sensor which detects the presence of a person by detecting a temperature change when an object having a temperature difference with the ambient temperature moves within a detection area.

However, the position in which the human detection sensor 60 is provided is an example. The human detection sensor 60 may also be provided on the front surface of the casing protrusion 24a.

Furthermore, a distance sensor using laser or ultrasonic waves, or a digital camera (image sensor) using a CCD or a complementary metal-oxide-semiconductor (CMOS) may be used as the human detection sensor 60. When a distance sensor is used, an object within predetermined detection area can be detected by a change in distance. When an image sensor is used, the movement of an object within a predetermined detection area can be detected by a change (movement) in the image.

Moreover, as another example, a floor sensor (pressure sensor) connected to the image forming apparatus 10 can be used as the human detection sensor 60. In this case, a floor sensor is provided in a floor area corresponding to a human detection area A (see FIG. 3) set around the image forming apparatus 10. The image forming apparatus 10 (main CPU 70) determines whether or not a person (user) exists in the human detection area A based on the output of the floor sensor.

Furthermore, although not shown, a controller that controls the operation of the components of the image forming apparatus 10 is provided in a predetermined position of the image forming apparatus 10. The controller includes processors (70 and 72), memory (74, 88, 90 and 92), and communication circuits (94 and 96) and the like described below, and controls the components of the image forming apparatus 10, causes the image forming apparatus 10 to execute various operations, and transmits and receives data with respect to a communicably connected device based on an input operation by the user toward the operation unit 18 and the like.

The operation unit 18 is also referred to as an operation device or an operation panel, and is formed having a horizontal rectangular plate shape. The operation unit 18 is provided downwardly inclined to the front side to enable the user to easily view the upper surface thereof (the upper surface of the operation panel). However, the operation unit 18 is attached to the casing of the image reader 14 such that the operation unit 18 is rotatable about its upper end portion.

The upper surface of the operation unit 18 includes a display 50, a touch panel 52, a home button 54, and a power saving key 56. The home button 54 and the power saving key 56 are vertically arranged to the right of the display 50 and the touch panel 52.

The home button 54 and the power saving key 56 are hardware keys (operation buttons) that use a capacitance-type switch. The home button 54 is a key for displaying a home screen on the display 50. Note that the home screen is a screen (basic screen) that displays a main menu, key images for selecting each function of copying, printing, faxing, and scanning, and a key image for displaying a setting screen for performing detailed settings relating to these and other functions.

The power saving key 56 is a key that switches the image forming apparatus 10 from a normal state (normal mode) to a power saving state (power saving mode), or switches (returns) the image forming apparatus 10 from the power saving state to the normal state. Here, in the power saving mode, power is supplied to at least the power saving key 56, the LED 59a, a backlight LED of the power saving key 56, the main CPU 70, the sub-CPU 72, the RAM 74, the RAM 92, the modem 94, the network interface card (NIC) 96, and the real-time clock (RTC) 98 of the image forming apparatus 10. Further, the power saving mode refers to a state in which the power supply to components such as the image forming unit 12 and the image leader 14 is off (stopped), and the power consumption amount of the image forming apparatus 10 is suppressed to a predetermined value (for example, 1 W) or less. Furthermore, the normal state (normal mode) is a state in which there are no restrictions on the power consumption, and refers to a state where power is supplied to all components except for some components that do not need to be operated. For example, for some components, such as the motor that drives the paper feeding roller and the transfer roller and some of the LEDs (a backlight of the touch panel 52, and the LEDs 59b and 59c), power is supplied only when operation is required.

The main power of the image forming apparatus 10 is turned on/off as a result of the power button 58 being turned on/off. When the main power of the image forming apparatus 10 is switched from off to on, the components of the image forming apparatus 10 are warmed up and the device is set to the normal mode. Furthermore, when the power button 58 is turned off, switching occurs to a reduced power state (reduced power mode) in which power consumption is reduced as far as possible. In the reduced power mode, power is supplied to at least the sub-CPU 72, the RAM 92, the modem 94, the NIC 96, and the RTC 98 of the image forming apparatus 10. Further, the reduced power mode refers to a state in which the power supply to components such as the power saving key 56, the LED 59a, the backlight LED of the power saving key 56, the image forming unit 12, and the image reader 14 is stopped, and the power consumption amount of the image forming apparatus 10 is further reduced from the power saving mode.

Figure 2:
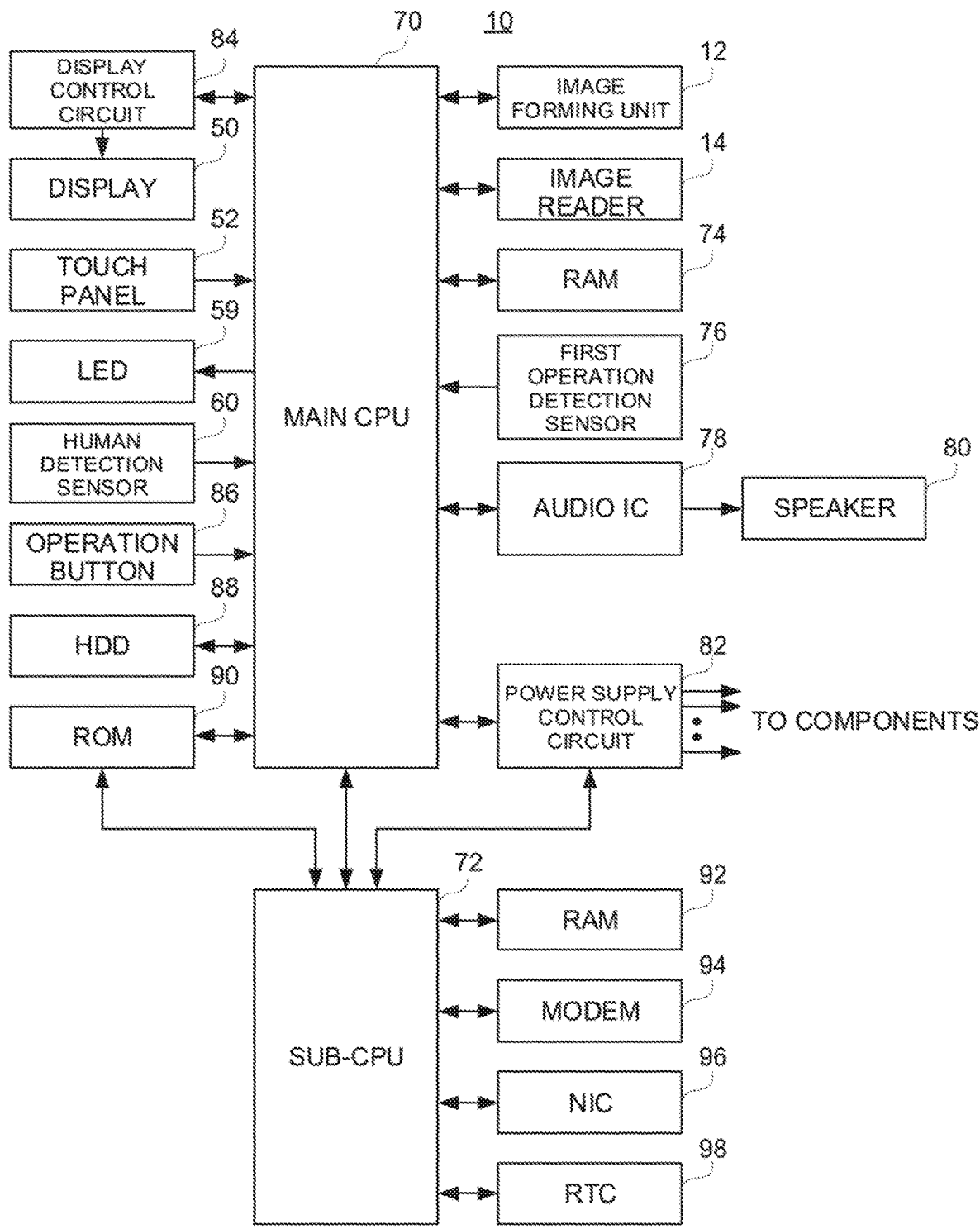
FIG. 2 is a block diagram showing an example of an electrical configuration of the image forming apparatus shown in FIG. 1.

FIG. 2 is a block diagram showing an example of an electrical configuration of the image forming apparatus 10 shown in FIG. 1. However, some components which are not directly related to the present invention are omitted.

As shown in FIG. 2, the image forming apparatus 10 includes a main CPU 70 and a sub-CPU 72. The main CPU 70 is connected to the image forming unit 12, the image reader 14, the touch panel 52, the LEDs 59 (LEDs 59a, 59b, and 59c and the like), and the human detection sensor 60, and is also connected to a RAM 74, a first operation detection sensor 76, an audio IC 78, a power supply control circuit 82, a display control circuit 84, an operation button 86, an hard disk drive (HDD) 88, and a read only memory (ROM) 90. Furthermore, the audio IC 78 is connected to a speaker 80. The display control circuit 84 is connected to the display 50.

The main CPU 70 performs the overall control of the image forming apparatus 10 according to programs stored in the ROM 90. Furthermore, the main CPU 70 performs intruder alert processing and theft alert processing according to the present embodiment according to programs stored in the ROM 90. The image forming unit 12 and the image reader 14 are as described above, and therefore, a duplicate description is omitted.

The display 50 is a general-purpose monitor such as a liquid crystal display (LCD). Other general-purpose monitors such as an electro-luminescence (EL) display can be used as the display 50. The display 50 displays various screens such as a home screen, which is a screen for selecting a desired job from the various jobs that are capable of being executed by the image forming apparatus 10, a setting screen for setting use/non-use of functions provided in the image forming apparatus 10 and setting the detailed contents of the used functions, and an operation screen for operating the image forming apparatus 10. Furthermore, the various screens display a status (operation state) of the image forming apparatus 10, images of software keys for accepting various settings, print instructions, and the like from the user, scanned images (preview images), images received (acquired) from external computers and recording media (input images, various messages, and the like.

Note that, in the present embodiment, a job refers to scanning, copying (including scanning of a document), printing, transmission of a fax, transmission of an email, and the like.

The touch panel 52 detects touch operations (touch inputs) inside a touch effective area of the touch panel 52, and outputs touch coordinate data indicating the positions of the touch operations to the main CPU 70. The touch panel 52 is a general-purpose touch panel, and an arbitrary type such as an electrostatic capacitance-type, electromagnetic induction-type, resistance film-type, or infrared-type touch panel may be used. In the present embodiment, an electrostatic capacitance-type touch panel is used as the touch panel 52, and the touch panel 52 is provided on the display surface of the display 50.

In the present embodiment, the touch panel 52 is provided on the display 50. However, a touch panel display in which these are integrally formed may be provided.

The LEDs (display lamps) 59 include the respective LEDs 59a to 59c, the LEDs used as backlights of the home button 54 and the power saving key 56. The LEDs 59 are individually turned on, turned off, and flash according to controls by the main CPU 70.

The human detection sensor 60 is, as described above, a human sensor that uses an infrared sensor. The main CPU 70 detects the presence of an object (a person or user) that exists inside a predetermined area (human detection area A) based on the output of the human detection sensor 60.

Figure 3:
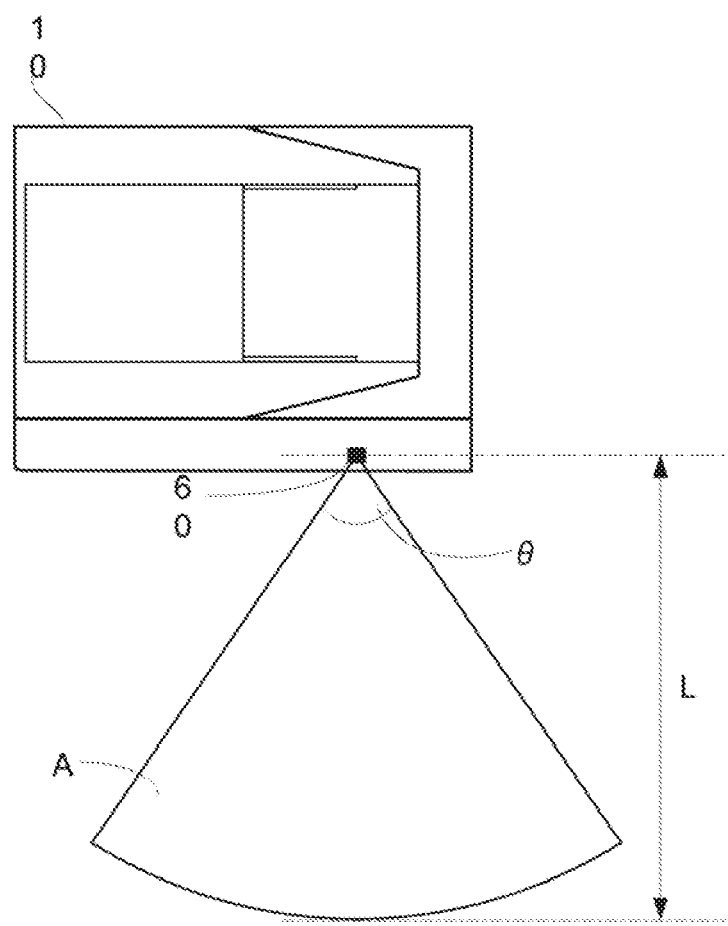
FIG. 3 is a diagram showing an example of a detection range of a human detection sensor provided in the image forming apparatus shown in FIG. 1.

FIG. 3 is a plan view for describing the human detection area A set around the image forming apparatus 10. The human detection area A is in front of the image forming apparatus 10, and is set as an area in which the presence of a user, considered to be using the image forming apparatus 10, can be detected. In the example shown in FIG. 3, a fan-shaped human detection area A is set in front of the image forming apparatus 10 (operation unit 18). The fan radius length L can be appropriately set according to the environment in which the image forming apparatus 10 is installed. However, the maximum value is limited by the maximum detection distance of the human detection sensor 60. The fan central angle θ can be appropriately set according to the environment in which the image forming apparatus 10 is installed. However, the maximum value is limited by the maximum horizontal viewing angle of the human detection sensor 60.

Although not shown, because the human detection sensor 60 detects a person such as a user, the central angle in the vertical direction of the human detection sensor 60 may be set to a magnitude that prevents the floor and ceiling from being detected in the human detection area A.

Returning to FIG. 2, the RAM 74 is used as a work area and a buffer area of the main CPU 70.

The first operation detection sensor 76 is a sensor that detects a predetermined user operation (hereinafter referred to as "first operation") that causes a concern that a consumable item used by the image forming apparatus 10, a unit provided in the image forming apparatus 10, or an additional device installed to the image forming apparatus 10 may be stolen. Note that the consumable items used by the image forming apparatus 10 are, for example, the paper sheets accommodated in the paper sheet feeding cassette 20, the toner cartridges, and the like. The predetermined units provided in the image forming apparatus 10 are, for example, the components of the image forming unit 12, such as the developing unit and the fixing unit. The additional devices installed to the image forming apparatus 10 are, for example, a post-processing device that performs post-processing such as stapling processing, punching processing, or sorting processing with respect to the paper sheets after image formation, a curl correction device, or an external paper sheet feeding device that supplies paper sheets to the image forming unit 12.

A first operation includes an operation for removing a consumable item from the image forming apparatus 10, such as an operation that opens and closes the paper sheet feeding cassette 20 or an operation that opens and closes the opening and closing cover 12c, an operation that detaches a predetermined unit from the image forming apparatus 10, and an operation that detaches an additional device from the image forming apparatus 10. The first operation detection sensor 76 includes a sensor for detecting the opening and closing of the paper sheet feeding cassette 20 or the opening and closing of the opening and closing cover 12c, a sensor for detecting whether or not a predetermined unit is installed to the image forming apparatus 10, and a sensor for detecting whether or not an additional device is installed to the image forming apparatus 10. FIG. 2 collectively shows these sensors as the first operation detection sensor 76. The main CPU 70 detects the presence of a first operation based on the output of the first operation detection sensor 76.

The audio IC 78 plays audio data according to an instruction from the main CPU 70, and outputs the played audio from the speaker 80. Therefore, a sound or audio (synthetic audio) corresponding to the audio data is output from the speaker 80.

The power supply control circuit 82 is a control circuit for supplying or stopping the supply of power (electric power) to each of the components of the image forming apparatus 10 according to an instruction from the main CPU 70 or the sub-CPU 72. The power supply control circuit 82 steps down and rectifies a commercial power supply, and supplies and stops the supply of a predetermined direct current voltage corresponding to each component.

The display control circuit 84 includes a graphic processing unit (GPU), video random access memory (SRAM), and the like. The GPU, under instructions from the main CPU 70, uses image generation data 304b (see FIG. 5) stored in the RAM 74 to generate display image data in the VRAM for displaying various screens on the display 50, and outputs the generated display image data to the display 50. Although a detailed description is omitted, the image generation data includes data such as polygon data and texture data.

The operation buttons 86 include various keys or buttons such as the home button 54, the power saving key 56, and the power button 58. The HDD 88 is the main memory of the image forming apparatus 10, and stores various data. The ROM 90 stores the programs executed by the main CPU 70 and the sub-CPU 72, and the unique information (model name and serial number) of the image forming apparatus 10.

The sub-CPU 72 is connected to the RAM 92, the modem 94, the NIC 96, and the RTC 98. The sub-CPU 72 executes communication control and power supply control according to programs stored in the ROM 90. The RAM 92 is used as a work area and a buffer area of the sub-CPU 72.

The modem 94 is a communication circuit for performing transmission and reception of faxes, and is connected to a public telephone line. The NIC 96 is a communication circuit for communicating with other electronic devices via a network (local area network (LAN) and Internet), and is connected to a LAN.

The RTC 98 is a clock circuit that counts time (including the year, the month, the day, and the time of day (hours, minutes, and seconds)). Although a detailed description is omitted, the day of the week can be known by means of a calendar function.

Although an illustration and detailed description is omitted, in the present embodiment, the RTC 98 is also connected to the main CPU 70. The main CPU 70 acquires time information from the RTC 98 in the normal mode.

An image forming apparatus 10 having such a configuration, as an example, is placed in a predetermined position in an office, and is turned on and set to the normal mode during working hours. In the normal mode, the image forming apparatus 10 executes copying, printing, transmission and reception of faxes, and transmission and reception of emails. Note that, in the normal mode, the image forming apparatus 10 is set to the power saving mode when the power saving key 56 is turned on, or when a state in which the image forming apparatus 10 is unused continues for a predetermined time period (for example, 30 minutes). Furthermore, the power of the image forming apparatus 10 is turned off and the reduced power mode is set during time periods in which the image forming apparatus 10 is not used (unused period), such as time periods outside of working hours.

As mentioned above, the power of the image forming apparatus 10 is turned on/off as a result of the power button 58 being turned on/off. Moreover, the power of the image forming apparatus 10 can also be turned on/off at set times on set days of the week by an electrical control as a result of the user setting a schedule.

In the image forming apparatus 10 according to the present embodiment, as a result of a user setting, the presence of an intruder at the installation position (location or area) of image forming apparatus 10 during the unused period in which the image forming apparatus 10 is not used is detected using a function included in the image forming apparatus 10. If an intruder is detected, the surroundings of the image forming apparatus 10, and a user who uses a predetermined terminal are alerted that an intruder was detected.

That is to say, when the image forming apparatus 10 is set to the reduced power mode, the image forming apparatus 10 is set to a mode capable of alerting that an intruder was detected (intruder alert mode).

In the present embodiment, if the surroundings of the image forming apparatus 10 are alerted that an intruder was detected, audio (intruder alert audio), whose content indicates that an intruder was detected, is output from the speaker 80 for a predetermined time (for example, one minute) or is repeated a predetermined number of times (for example, ten times). At this time, the intruder alert audio is output from the speaker 80 at a preset volume (for example, the maximum volume). The volume of the intruder alert audio is different from the set volume for fax transmission or reception, and for error alerts in the normal mode.

Furthermore, in the present embodiment, if the user who uses a predetermined terminal is to be alerted that an intruder was detected, an email, which includes a message (intruder alert message) indicating that an intruder was detected, is transmitted to a preset destination. If a plurality of destinations (mail addresses) is registered, an email including an intruder alert message is transmitted to each destination. The intruder alert message includes text that indicates that an intruder was detected, and unique information relating to the image forming apparatus 10 that detected the intruder. The unique information relating to the image forming apparatus 10 describes, in addition to the unique information (model name and serial number) stored in the ROM 90, a device name assigned to the image forming apparatus 10 by the user or administrator of the image forming apparatus 10, and machine code. As a result of recording a position (location or area) in which the image forming apparatus 10 is installed in association with the unique information, the image forming apparatus 10 serving as the transmission source of the intruder alert message can be specified based on the intruder alert message, and the position (location or area) in which the image forming apparatus 10 is installed can also be known. Therefore, the position (location or area) in which the intruder was detected is specified.

However, if a destination is not registered, an email including an intruder alert message is not transmitted.

As a result of setting the intruder alert mode and alerting that an intruder was detected in this manner, an effect that prevents intrusion to the position (location or area) in which the image forming apparatus 10 is installed, and inhibits of usage of the image forming apparatus 10 during the unused period can be expected.

Furthermore, in the image forming apparatus 10 according to the present embodiment, if a first operation that causes a concern that a consumable item, a unit, an additional device, and the like (hereinafter, sometimes referred to as "consumable items and the like") may be stolen exists during the unused period in which the image forming apparatus 10 is not used, theft alert processing is performed that alerts the surroundings of the image forming apparatus 10 and the user who uses a predetermined terminal that there is a concern that consumable items and the like may be stolen.

That is to say, when the image forming apparatus 10 is set to the reduced power mode, the image forming apparatus 10 is set to a mode (theft alert mode) capable of alerting that there is a concern that consumable items and the like may be stolen. Note that the theft alert mode is set in parallel with the intruder alert mode described above.

In the present embodiment, if the surroundings of the image forming apparatus 10 are alerted that there is a concern that consumable items and the like may be stolen, audio (theft alert audio), whose content indicates that there is a concern that consumable items and the like may be stolen, is output from the speaker 80 for a predetermined time or is repeated a predetermined number of times. At this time, the theft alert audio is output from the speaker 80 at a preset volume. The volume of the theft alert audio is different from the set volume for fax transmission or reception and error alerts, and the volume of the intruder alert audio in the normal mode.

Furthermore, in the present embodiment, if the user who uses a predetermined terminal is alerted that there is a concern that consumable items and the like may be stolen, an email which includes a message (theft alert message), indicating that there is a concern that consumable items and the like may be stolen, is transmitted to a preset destination. If a plurality of destinations is registered, an email including a theft alert message is transmitted to each destination. The theft alert message includes text that indicates that there is a concern that consumable items and the like may be stolen, and unique information relating to the image forming apparatus 10 for which there exists a concern that consumable items and the like may be stolen. As a result of recording the position in which the image forming apparatus 10 is installed in association with the unique information, the image forming apparatus 10 serving as the transmission source of the theft alert message can be specified based on the theft alert message, and the position in which the image forming apparatus 10 is installed can also be known.

However, if a destination is not registered, an email including a theft alert message is not transmitted.

In this manner, by setting the theft alert mode and issuing an alert that there is a concern that consumable items and the like may be stolen, consumable items and the like can be prevented from being stolen.

When the intruder alert mode and the theft alert mode are set, it is necessary for power to be supplied to the components that detect an intruder or a first operation. Therefore, the power consumption amount increases relative to the cases of the power saving mode and the reduced power mode. In the intruder alert mode and the theft alert mode, power is supplied to the human detection sensor 60, the first operation detection sensor 76, and the main CPU 70 of the image forming apparatus 10 in addition to the components to which power is supplied in the reduced power mode.

Furthermore, in cases where an alert is issued that an intruder was detected, and in cases where an alert is issued indicating that there exists a concern that consumable items and the like may be stolen, the fact that an error has occurred, such as a toner shortage in the image forming apparatus 10, is irrelevant. Therefore, when the current time becomes a set specified time for the power to be turned off (hereinafter, referred to as "first specified time"), the intruder alert mode and the theft alert mode are set in addition to the power being turned off. As a result, as described above, when the existence of an intruder is detected, an alert is issued indicating that an intruder was detected upon detection of the intruder. Furthermore, when the existence of a first operation is detected, an alert is issued indicating that there exists a concern that consumable items and the like may be stolen upon detecting the first operation. Furthermore, when the current time becomes a set specified time for the power to be turned on (hereinafter, referred to as "second specified time"), the intruder alert mode and the theft alert mode are released. That is to say, the normal mode is set. That is to say, in the present embodiment, a first specified time represents a start time of the intruder alert mode and the theft alert mode, and a second specified time represents an end time of the intruder alert mode and the theft alert mode. That is to say, the setting and releasing of the theft alert mode and the intruder alert mode are linked.

Figure 4:
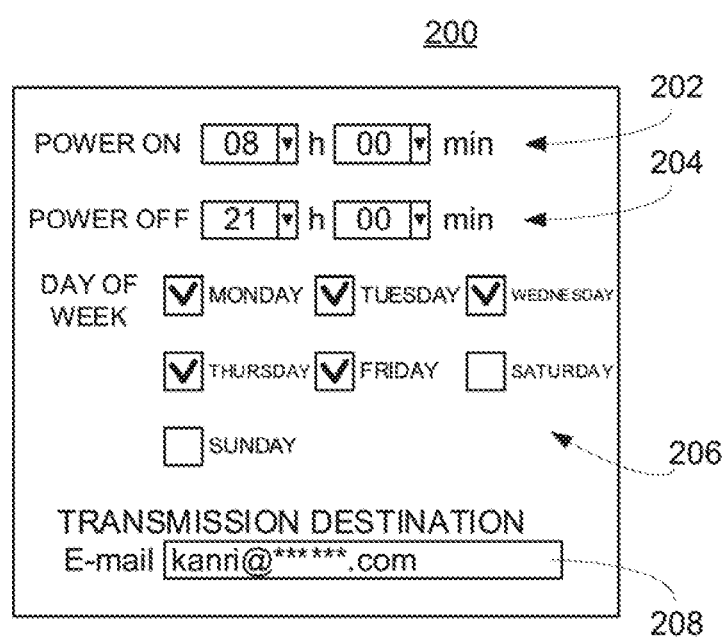
FIG. 4 is a diagram showing an example of a first setting screen.

FIG. 4 is a diagram showing an example of a setting screen (first setting screen) 200 for determining or changing the setting conditions and the like of the theft alert mode and the intruder alert mode. The first setting screen 200 is displayed on the display 50 according to a user operation. As shown in FIG. 4, the second setting screen 200 includes setting areas 202, 204, 206, and 208. The setting area 202 is an area for setting a second specified time at which the power of the image forming apparatus 10 is turned on. The setting area 204 is an area for setting a first specified time in which the power of the image forming apparatus 10 is turned off. The first specified time and the second specified time, in which the power of the image forming apparatus 10 is turned on and off, may be selected from a pull-down menu, or directly input using software keys. The setting area 206 is an area for setting the days of the week in which the theft alert mode and the intruder alert mode are set. The user inserts check marks into the check boxes of those days of the week the theft alert mode and the intruder alert mode are to be set, and removes check marks from the check boxes of those days of the week in which the theft alert mode and the intruder alert mode are not to be set. The setting area 208 is an area for inputting (setting) an email address of the transmission destination (predetermined terminal) to which messages and the like are transmitted in the theft alert mode and the intruder alert mode. Although the detailed explanation is omitted, a plurality of transmission destination email addresses can be set as long as the number of addresses or the number of characters is within a limit. However, a destination is not registered if an email is not to be transmitted.

Figure 5:
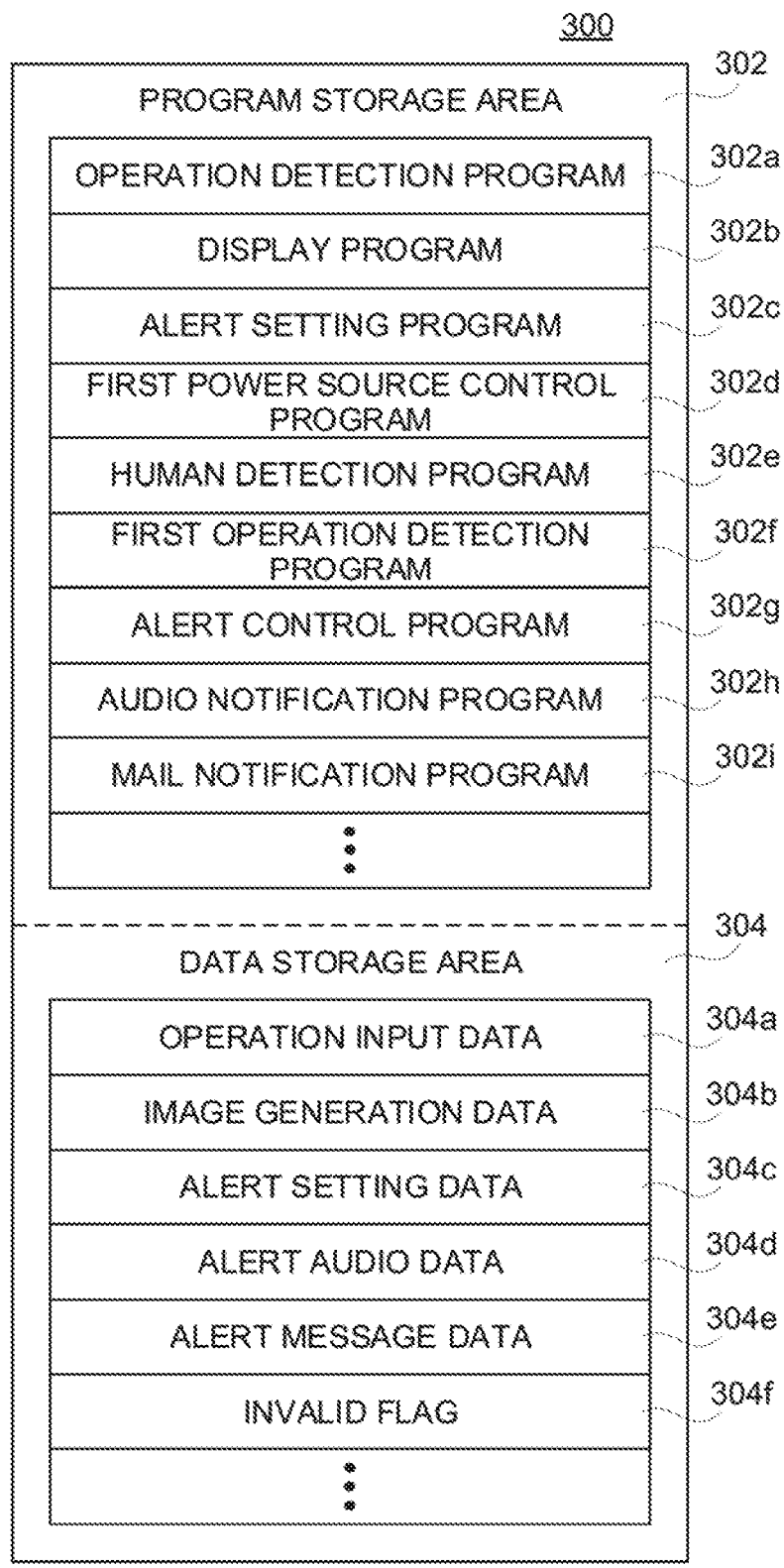
FIG. 5 is a diagram showing an example of a memory map of a random access memory (RAM) connected to the main central processing unit (CPU) shown in FIG. 2.

FIG. 5 is a diagram showing an example of a memory map 300 of the RAM 74 shown in FIG. 2. The RAM 74 includes a program storage area 302 and a data storage area 304. The program storage area 302 stores an operation detection program 302a, a display program 302b, an alert setting program 302c, a first power supply control program 302d, a human detection program 302e a first operation detection program 302f, an alert control program 302g, an audio alert program 302h, a mail alert program 302i, and the like.

The operation detection program 302a is a program for detecting operation input data, which is input according to operations performed with respect to the touch panel 52 and the operation buttons 86, and for storing the data in the data storage area 304.

The display program 302b is a program for generating the display image data corresponding to various screens, such as the first setting screen 200, and for outputting (displaying) the generated display image data on the display 50.

The alert setting screen 302c is a program for determining or changing various setting conditions in the first setting screen 200 displayed on the display 50 as a result of a user operation. The content of the determined setting conditions (alert setting data 304c) is saved in the HDD 88 by the main CPU 70. Note that the first setting screen 200 is displayed on the display 50 according to the display program 302b.

The first power supply control program 302d is a program for controlling the power supply control circuit 82 in response to the power saving key 56 being operated, and for supplying and stopping the supply of power to each of the components such that the image forming apparatus 10 is set to the power saving mode or the normal mode. Also, The first power supply control program 302d is a program for controlling the power supply control circuit 82 in response to the on/off of the power button 58, and for supplying and stopping the supply to each of the components such that the image forming apparatus 10 is set to the reduced power mode or the normal mode.

Furthermore, the first power supply control program 302d is a program for controlling the power supply control circuit 82 when the image forming apparatus 10 is continuously unused for at least a predetermined time period (for example, 30 minutes) in the normal mode, and for supplying and stopping the supply of power to each of the components such that the power saving mode is automatically set.

Furthermore, first power supply control program 302d is a program for controlling the power supply control circuit 82 such that, if the reduced power mode is not set, the reduced power mode is set in response to the current time becoming a first specified time, and for supplying and stopping the supply of power to each of the components.

Moreover, the first power supply control program 302d controls the power supply control circuit 82 to supply and stop the supply of power to each of the components such that the image forming apparatus 10 is set to the reduced power mode in response to the current time becoming a first specified time, and then also serves as a program for supplying and stopping the supply of power to each of the components such that the image forming apparatus 10 is set to the intruder alert mode and the theft alert mode. Note that, even when the supply of power is controlled such that the reduced power mode is set, the supply of power to the main CPU 70 is not stopped.

Figure 7:
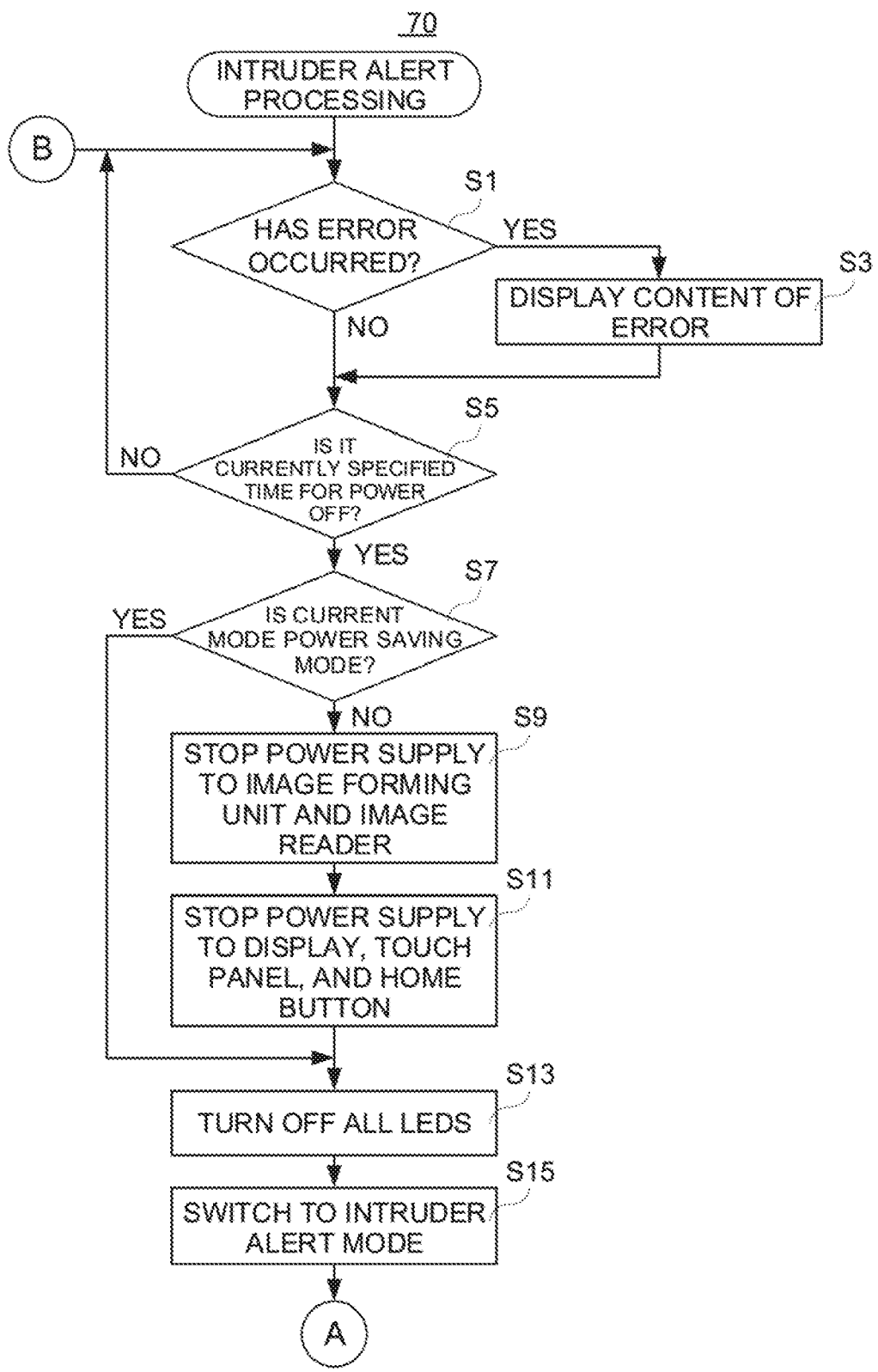
FIG. 7 is a flow chart showing part of an example of intruder alert processing performed by the main CPU shown in FIG. 2.

If the current time becomes a first specified time, there is a partial difference in the components whose supply of power is stopped when the normal mode is set and when the power saving mode is set (see FIG. 7).

In addition, the first power supply control program 302d is a program for controlling the power supply control circuit 82 according to a control by the sub-CPU 72, and for supplying and stopping the supply of power to each of the components such that the image forming apparatus 10 is set to the normal mode.

The human detection program 302e is a program for detecting, according to the output of the human detection sensor 60, an object (person or user) that exists inside the human detection area A set around the image forming apparatus 10.

The first operation detection program 302*f* is a program for detecting, according to the output of the first operation detection sensor 76, the presence of a first operation that causes a concern that consumable items and the like may be stolen.

The alert control program 302*g* is a program for executing intruder alert processing that, when the intruder alert mode is set and a person is detected inside the human detection area A, alerts the surroundings of the image forming apparatus 10, and the user who uses the terminal at a pre-registered destination, that an intruder was detected. Furthermore, the alert control program 302*g* is a program for executing intruder alert processing that, when the theft alert mode is set and it is determined that a first operation exists, alerts the surroundings of the image forming apparatus 10, and the user who uses the terminal at a pre-registered destination, that there is a concern that consumable items and the like may be stolen. However, if a destination is not registered, the alert control program 302*g* only alerts the surroundings of the image forming apparatus 10 by audio that an intruder was detected, or that there is a concern that consumable items and the like may be stolen.

The audio alert program 302*h* is a program for alerting by audio that an intruder was detected or that there is a concern that consumable items and the like may be stolen. The mail alert program 302*i* is a program for transmitting, to a pre-registered destination, an email which includes a message indicating that an intruder was detected, or that there is a concern that consumable items and the like may be stolen.

Although not shown, the program storage area 302 also stores a program for executing various functions using the main CPU 70.

The data storage area 304 of the RAM 74 stores operation input data 304*a*, image generation data 304*b*, alert setting data 304*c*, alert audio data 304*d*, alert message data 304*e*, an inactive flag 304*f*, and the like.

The operation input data 304*a* is touch coordinate data and/or operation data detected (acquired) according to the operation detection program 302*a*. The detected touch coordinate data and/or operation data is stored in the data storage area 304 according to a time series.

The image generation data 304*b* is image data that includes polygon data and texture data for generating the display image data corresponding to various screens, such as the first setting screen 200 displayed on the display 50.

The alert setting data 304*c* is data that relates to the setting conditions of the theft alert mode and the intruder alert mode. Specifically, the alert setting data 304*c* represents data that relates to the first specified time, the second specified time, the days of the week, and the transmission destination mail address set in the first setting screen 200 shown in FIG. 4.

The alert audio data 304*d* is data that relates to the synthetic audio corresponding to the intruder alert audio and the theft alert audio. The alert message data 304*e* is data for issuing, by email, an alert that includes the intruder alert message or the theft alert message described above. The alert audio data 304*d* and the alert message data 304*e* are, for example, read from the HDD 88 and stored in the data storage area 304 of the RAM 74 when the intruder alert processing is started.

The inactive flag 304*f* is a flag for determining whether or not the human detection sensor 60 is inactive. If the inactive flag 304*f* is on, the human detection sensor 60 is inactive. If the inactive flag 304*f* is off, the human detection sensor 60 is active. For example, if the human detection sensor 60 is inactive, the main CPU 70 ignores the output of the human detection sensor 60. If the human detection sensor 60 is active, the main CPU 70 determines whether or not a person exists inside the human detection area A based on the output of the human detection sensor 60. However, the human detection sensor 60 is made inactive for a predetermined time (for example, several minutes to several tens of minutes) when an intruder is detected in the intruder alert mode. In the present embodiment, the output of the human detection sensor 60 is ignored when the human detection sensor 60 is inactive. However, the supply of power to the human detection sensor 60 may be stopped instead.

The human detection sensor 60 is made inactive in this manner to prevent the same intruder from being repeatedly detected when an intruder is detected, and for detection of that intruder being alerted each time.

Although not shown, the data storage area 304 stores other data necessary for execution of the overall processing of the image forming apparatus 10, and is provided with timers (counters) and registers necessary for execution of the overall processing.

Figure 6:
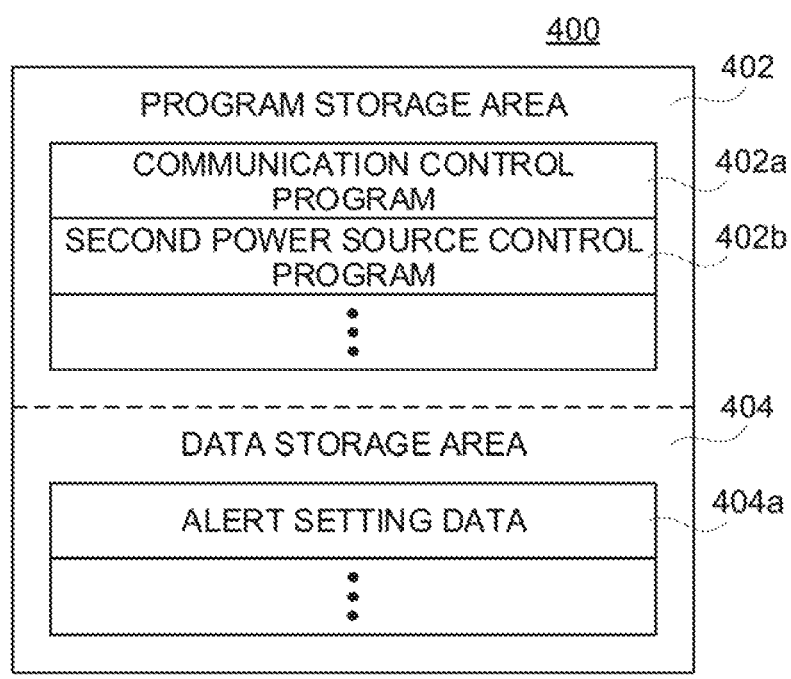
FIG. 6 is a diagram showing an example of a memory map of a RAM connected to the sub-CPU shown in FIG. 2.

FIG. 6 is a diagram showing an example of a memory map 400 of the RAM 92 shown in FIG. 2. The RAM 92 includes a program storage area 402 and a data storage area 404.

The communication program 402*a* includes a program for executing fax communication using the modem 94, and a program for executing network communication using the NIC 96. Furthermore, the communication program 402*a* is also a program for instructing the main CPU 70 to execute external job in response to an external job request.

The second power supply control program 402*b* is a program for instructing the main CPU 70 to set the normal mode in response to the current time becoming a second specified time. Therefore, the main CPU 70 controls the power supply control circuit 82, and supplies and stops the supply of power to each of the components such that the image forming apparatus 10 is set to the normal mode.

Although not shown, program storage area 402 also stores programs for executing various functions using the sub-CPU 72.

The data storage area 404 of the RAM 92 stores alert setting data 404*a* and the like. The alert setting data 404*a* is the same as the alert setting data 304*c* described above. Therefore, a duplicate description is omitted.

Figure 8:
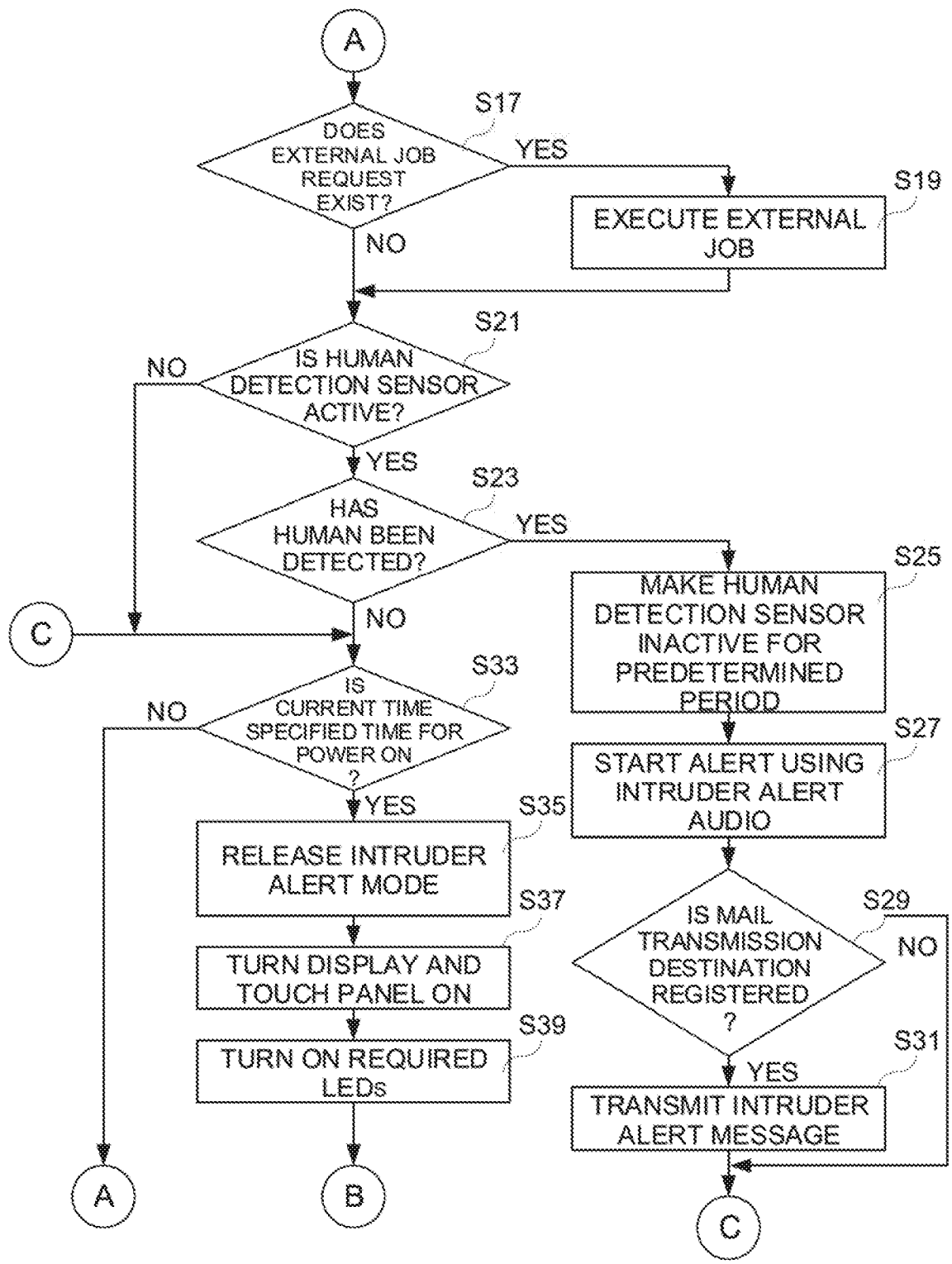
FIG. 8 is a flow chart, which follows on from FIG. 7, showing another part of the intruder alert processing performed by the main CPU shown in FIG. 2.

FIG. 7 and FIG. 8 are an example of a flow chart of the intruder alert processing performed by the main CPU 70 shown in FIG. 2. The main CPU 70 executes the overall processing of the image forming apparatus 10, and also executes processing according to instructions from the sub-CPU 72.

As shown in FIG. 7, when the main CPU 70 starts the intruder alert processing, it is determined in step S1 whether or not an error has occurred. Here, the main CPU 70 determines whether or not an error has occurred, such as a paper jam, toner shortage, or a paper shortage. For example, the main CPU 70 determines whether or not a paper jam has occurred based on the output of a jam sensor provided on the paper sheet transport path. Furthermore, the main CPU 70 determines whether or not a toner shortage has occurred by calculating a toner usage amount. In addition, the main CPU 70 determines whether or not a paper shortage has occurred in the paper sheet cassette or the paper sheet tray based on the output of an optical sensor or a mechanical sensor.

If the result of step S1 is "YES", that is to say, if an error has occurred, the content of the error is displayed in step S3, and the process proceeds to step S5. In step S3, the main CPU 70 displays an error occurrence screen on the display 50. For example, the error occurrence screen displays an image that enables the location where the error occurred to be known, and a message that enables the content of the error to be understood.

On the other hand, if the result of step S1 is "NO", that is to say, if an error has not occurred, it is determined in step S5 whether or not the current time is a specified time for the power to be turned off, that is to say, a first specified time. Here, the main CPU 70 determines whether or not the current time notified by the RTC 98 has become a first specified time (time for the power to be turned off) included in the alert setting data 304*c*. At this time, in addition to determining whether or not the current time has become a first specified time, it is also determined whether or not the day of the week is one in which the intruder alert processing is to be performed.

If the result of step S5 is "NO", that is to say, if the current time is not a first specified time, the process returns to step S1. On the other hand, if the result of step S5 is "YES", that is to say, if the current time is a first specified time, it is determined in step S7 whether or not the current mode is the power saving mode. If the result of step S7 is "YES", that is to say, if the current mode is the power saving mode, the process proceeds to step S13. On the other hand, if the result of step S7 is "NO", that is to say, if the current mode is the normal mode, the power supply control circuit 82 is instructed to stop the supply of power to the image forming unit 12 and the image reader 14 in step S9. Then, in step S11, the power supply control circuit 82 is instructed to stop the supply of power to the display 50, the touch panel 52, and the home button 54, and the process proceeds to step S13.

In step S13, the power supply control circuit 82 is instructed to turn off all of the LEDs 59. Therefore, in the state following completion of the processing of step S13, the supply of power is stopped to all of the components of the image forming apparatus 10, except for the power button 58, the main CPU 70, the sub-CPU 72, the RAM 74, the RAM 92, the modem 94, the NIC 96, and the RTC 98. In step S15, switching is performed to the intruder alert mode. Here, the main CPU 70 also supplies power to the human detection sensor 60, and switches to a state in which an alert can be issued if an intruder is detected.

As shown in FIG. 8, in the following step S17, it is determined whether or not an external job request exists. Here, the main CPU 70 determines whether or not the main CPU 70 has been instructed by the sub-CPU 72 to perform an external job that executes printing, receives a fax, receives an email, and the like.

If the result of step S17 is "YES", that is to say, if an external job request exists, the requested (instructed) external job is executed in step S19, and the process proceeds to step S21. Therefore, the main CPU 70 controls the power supply control circuit 82 to start the supply of power to the components that are required for execution of the external job, and executes the external job instructed by the sub-CPU 72.

Next, in step S21, it is determined whether or not the human detection sensor 60 is active. Here, the main CPU 70 determines whether or not an inactive flag 304*f* is off. If the result of step S21 is "NO", that is to say, the inactive flag 304*f* is on, the human detection sensor 60 is inactive, and therefore the process proceeds to step S33. If the result of in step S21 is "YES", that is to say, the inactive flag 304*f* is off, the human detection sensor 60 is activated, and therefore it is determined in step S23 whether or not a person (object) has been detected. Here, the main CPU 70 determines whether or not a person exists in the human detection area A based on the output of the human detection sensor 60.

If the result of step S23 is "YES", that is to say, if a person is detected, the human detection sensor 60 is made inactive for a predetermined time period in step S25. Here, the main CPU 70 turns on the inactive flag 304*f*.

In the following step S27, audio intruder alert processing (see FIG. 9) described below is started. Then, in step S29, it is determined whether or not a mail transmission destination is registered. That to say, the main CPU 70 refers to the alert setting data 304*c*, and determines whether or not an email address is registered.

If the result of step S29 is "NO", that is to say, if a mail transmission destination is not registered, the process proceeds to step S33. On the other hand, if the result of step S29 is "YES", that is to say, if a mail transmission destination is registered, an intruder alert message is transmitted in step S31, and the process proceeds to step S33. Therefore, the main CPU 70 acquires a destination mail address from the alert setting data 304*c*, creates an email that includes in the main text the intruder alert message indicated by the alert message data 304*e*, and instructs the sub-CPU 72 to transmit the created email via the NIC 96.

Furthermore, if the result of step S23 is "NO", that is to say, if a person is not detected, in step S33 it is determined whether or not the current time is a specified time for the power to be turned on, that is to say, a second specified time. Here, the sub-CPU 72 determines whether or not the current time notified by the RTC 98 has become a second specified time included in the alert setting data 404*a*. At this time, in addition to determining whether or not the current time has become a second specified time, it is also determined whether or not the day of the week is one in which the intruder alert processing is to be performed. Then, the sub-CPU 72 notifies the determination result to the main CPU 70.

If the result of step S33 is "NO", that is to say, if the current time is not a second specified time, the process returns to step S17. On the other hand, if the result of step S33 is "YES", that is to say, if the current time is a second specified time, the intruder alert mode is released in step S35. Here, the main CPU 70 instructs the power supply control circuit 82 to stop the supply of power to the human detection sensor 60. In the following step S37, the display 50 and the touch panel 52 are turned on. Then, in step S39, the necessary LEDs 59 (here, the backlight of the home button 54 and the LED 59*a*) are turned on, and the process returns to step S1 shown in FIG. 7.

Figure 9:
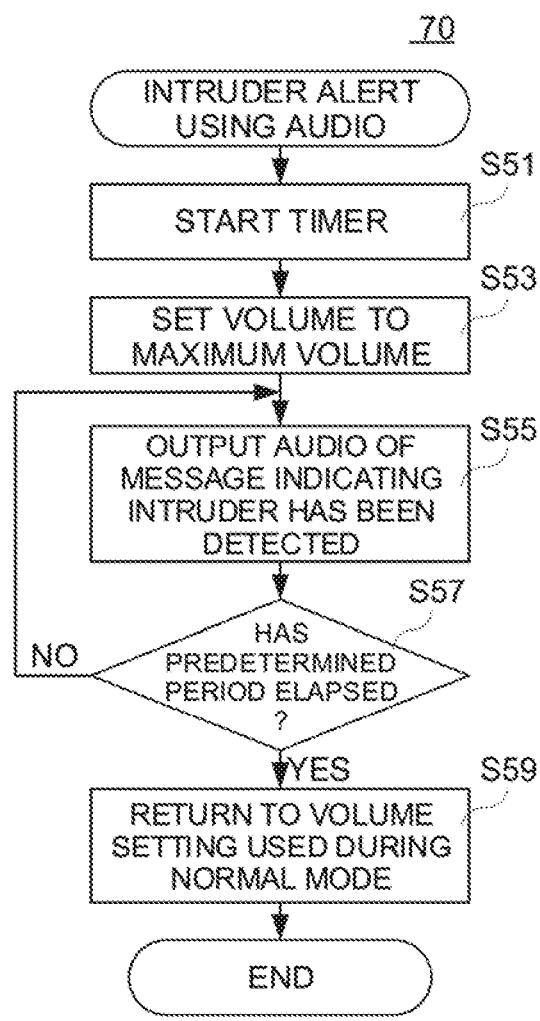
FIG. 9 is a flow chart showing an example of audio intruder alert processing performed by the main CPU shown in FIG. 2.

FIG. 9 is a flow chart showing an example of the audio intruder alert processing performed by the main CPU 70 shown in FIG. 2. The main CPU 70 executes the audio intruder alert processing in parallel with the intruder alert processing shown in FIG. 7 and FIG. 8.

As shown in FIG. 9, when the main CPU 70 starts the audio intruder alert processing, the main CPU 70 starts a timer in step S51. Although not shown, a timer (counter) is provided in the RAM 74.

In the following step S53, the volume of the speaker 80 is set to the maximum value. In the following step S55, a message that alerts that an intruder was detected is output in audio form. Here, under instructions from the main CPU 70, the audio IC 78 plays the alert audio data 304*d*. As a result, the intruder alert audio corresponding to the alert audio data 304*d* is output from the speaker 80 at the maxi volume set in step S53.

As described above, in step S53, the audio volume output from the speaker 80 is set to the maximum value irrespective of the volume setting value (including mute) in the normal mode. Note that the volume does not have to be set to the maximum value. The user may also set the volume to a desired level.

Next, in step S57, it is determined whether or not a predetermined time period (for example, one minute) has elapsed. If the result of step S57 is "NO", that is to say, if the predetermined time period has not elapsed, the process returns to step S55. If the result of step S57 is "YES", that is to say, if the predetermined time period has elapsed, the volume setting is returned to the setting used in the normal mode in step S59, and the audio intruder alert processing is completed.

Because the playback duration of the audio corresponding to the alert audio data 304d is, for example, six to eight seconds, the intruder alert audio is repeatedly output by the processing of steps S55 and S57 until the predetermined time period has elapsed.

Figure 10:
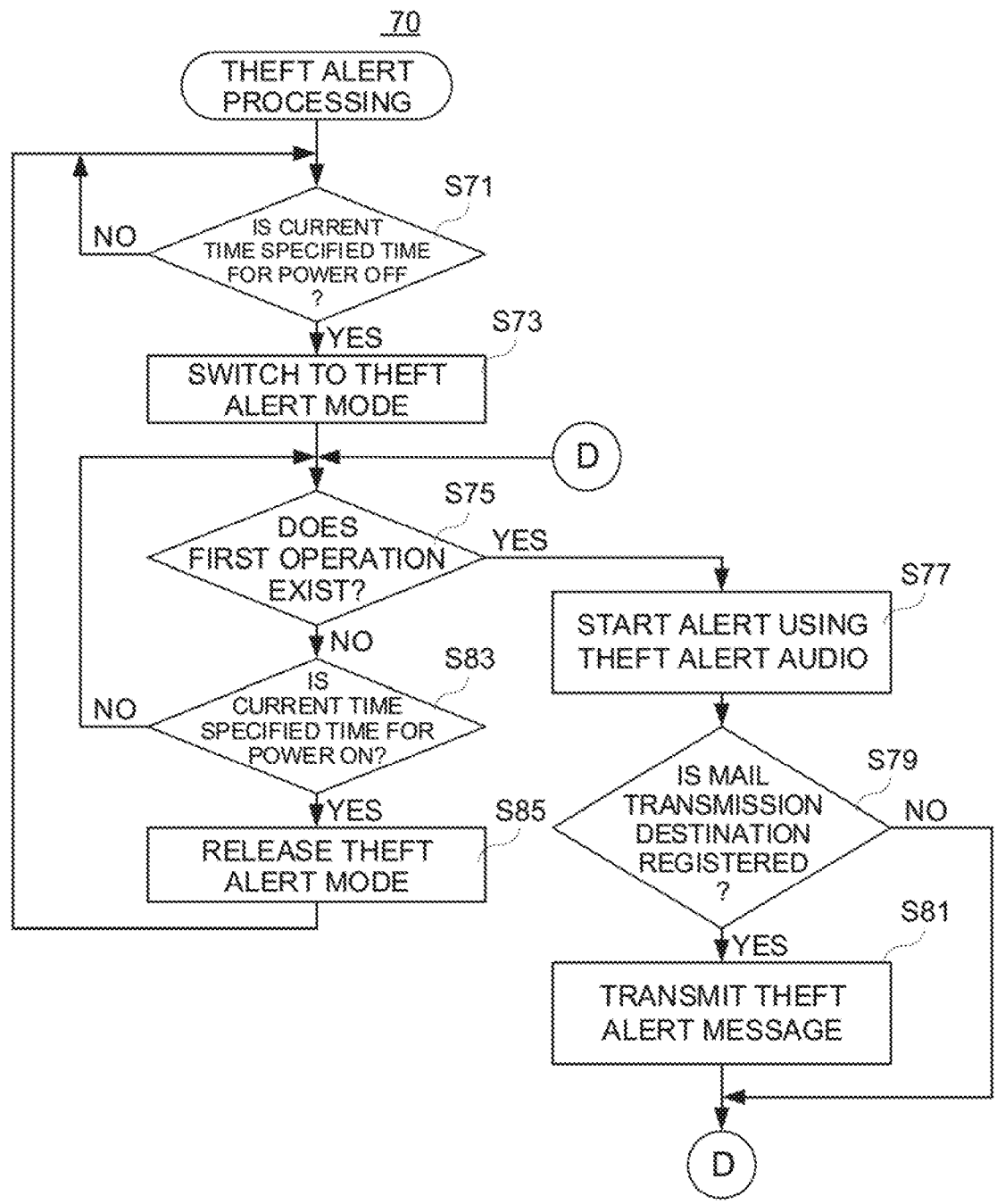
FIG. 10 is a flow chart showing part of an example of theft alert processing performed by the main CPU shown in FIG. 2.

FIG. 10 is an example of a flow chart of the theft alert processing performed by the main CPU 70 shown in FIG. 2. The main CPU 70 executes the theft alert processing in parallel with the intruder alert processing shown in FIG. 7 and FIG. 8, and the audio intruder alert processing shown in FIG. 9.

As shown in FIG. 10, when the main CPU 70 starts the theft alert processing, the main CPU 70 determines in step S71 whether or not the current time is a first specified time. If the result of step S71 is "NO", the process returns to step S71. On the other hand, if the result of step S71 is "YES", switching is performed to the theft alert mode in step S73. Here, the main CPU 70 also supplies power to the first operation detection sensor 76, and switches to a state in which an alert can be issued if a first operation is detected.

In the following step S75, it is determined whether or not a first operation exists. Here, the main CPU 70 determines the presence of the first operation based on the output of the first operation detection sensor 76. If the result of step S75 is "YES", that is to say, if it is determined that a first operation exists, audio theft alert processing is started in step S77. The audio theft alert processing is the same processing as the audio intruder alert processing (see FIG. 9). A detailed description is omitted because the only difference is that, in step S55 of the audio intruder alert processing, a message is output in audio form alerting that there is a concern that a consumable item or the like may be stolen, instead of a message being output in audio form alerting that an intruder was detected.

Then, in step S79, it is determined whether or not a mail transmission destination is registered. If the result of step S79 is "NO", that is to say, if a mail transmission destination is not registered, the process proceeds to step S83. On the other hand, if the result of step S79 is "YES", that is to say, if a mail transmission destination is registered, a theft alert message is transmitted in step S81, and the process proceeds to step S75. Therefore, the main CPU 70 acquires a destination mail address from the alert setting data 304c, creates an email that contains the theft alert message in the main text, and instructs the sub-CPU 72 to transmit the created email via the NIC 96.

Furthermore, if the result of step S75 is "NO", that is to say, is determined that the first operation does not exist, it is determined in step S83 whether or not the current time is a second specified time. If the result of step S83 is "NO", that is to say, if the current time is not a second specified time, the process returns to step S75. On the other hand, if the result of step S83 is "YES", that is to say, if the current time is a second specified time, the theft alert mode is released in step S85, and the process returns to step S71.

According to the present embodiment, when the image for apparatus 10 is unused, a function included in the image forming apparatus 10, specifically the first operation detection sensor 76, is used to determine the presence of a first operation that causes a concern that consumable items and the like may be stolen. If it is determined that a first operation exists, the surroundings of the image forming apparatus 10 and/or a user who uses the terminal at a registered destination is alerted that there is a concern that consumable items and the like may be stolen. Therefore, consumable items and the like can be inhibited or prevented from being stolen using a simple configuration.

In the present embodiment, the intruder alert audio or the theft alert audio is output. However, instead of this audio, a predetermined sound or a predetermined melody may be output.

Second Embodiment

The image forming apparatus 10 according to the second embodiment is the same as that of the first embodiment, except for additions and changes with respect to some of the configurations. Therefore, a duplicate description is omitted.

In the second embodiment, a consumable item lock mechanism that prevents consumable items used in the image forming apparatus 10 from being detached, a unit lock mechanism that prevents units included in the image forming apparatus 10 from being detached, and an additional device lock mechanism that prevents additional devices installed to the image forming apparatus 10 from being detached, are additionally provided.

The consumable item lock mechanism includes a mechanism that prevents the paper sheet feeding cassette 20 from being pulled out, and a mechanism that prevents toner cartridges from being detached from the image forming apparatus 10. The unit lock mechanism includes a mechanism that prevents the developing unit, the fixing unit, and the like, from being detached from the image forming apparatus 10. The additional device lock mechanism includes a mechanism that prevents post-processing devices, the curl correction device, or the external paper sheet feeding device from being detached from the image forming apparatus 10. Furthermore, the consumable item lock mechanism and the unit lock mechanism include a mechanism that prevents the opening and closing cover 12c from be opened. This is because, as a result of the opening and closing cover 12c being locked, the toner cartridges and the units can no longer be detached.

Furthermore, the consumable item lock mechanism, the unit lock mechanism, and the additional device lock mechanism are each connected to the main CPU 70. In addition, although not shown, the program storage area 302 of the RAM 74 stores a lock mechanism control program for switching the on (locked state)/off (unlocked state) of the lock mechanisms. The main CPU 70 issues an instruction to turn on the lock mechanisms or an instruction to turn off the lock mechanisms according to the lock mechanism control program. Further, the consumable item lock mechanism, the unit lock mechanism, and the additional device lock mechanism each have the lock mechanism turned on/off under instructions from the main CPU 70.

The specific configurations and locking methods of the consumable item lock mechanism, the unit lock mechanism, and the additional device lock mechanism are not particularly limited. A mechanical locking mechanism or an electrical locking mechanism may be used. For specific examples of such lock mechanisms, refer to Japanese Laid-Open Patent Application Publication No. 2005-126195, Japanese Laid-Open Patent Application Publication No. 2007-062985, and Japanese Laid-Open Patent Application Publication No. 2015-174756 filed by the present applicant.

In the image forming apparatus 10 according to the second embodiment, the lock mechanisms are turned on during an unused period in which the image forming apparatus 10 is not used. Specifically, the lock mechanisms are turned on when the current time becomes a first specified time, and the lock mechanisms are turned off when the current time becomes a second specified time. That is to say, the lock mechanisms are turned on when the theft alert mode and the intruder alert mode are set. Further, the lock mechanisms are turned off when the theft alert mode and the intruder alert mode are released. In this manner, the on/off of the lock mechanisms is linked with the setting and releasing of the theft alert mode and the intruder alert mode.

Figure 11:
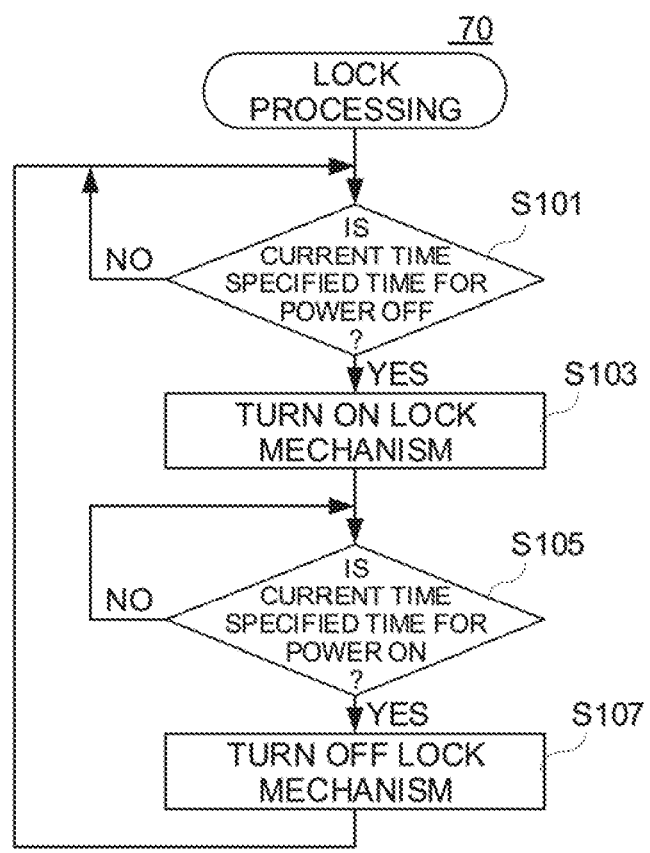
FIG. 11 is a flow chart showing an example of lock processing performed by the main CPU according to a second embodiment.

FIG. 11 is an example of a flow chart of the lock processing performed by the main CPU 70 shown in FIG. 2. The main CPU 70 executes the lock processing in parallel with the intruder alert processing shown in FIG. 7 and FIG. 8, the audio intruder alert processing shown in FIG. 9, and the theft alert processing shown in FIG. 10.

As shown in FIG. 11, when the main CPU 70 starts the lock processing, the main CPU 70 determines in step S101 whether or not the current time is a first specified time. If the result of step S101 is "NO", the process returns to the same step S101. On the other hand, if the result of step S101 is "YES", the lock mechanism is turned on in step S103 (locked state). If a plurality of lock mechanisms exists, all of the lock mechanisms are turned on. Here, the main CPU 70 supplies power to the lock mechanism, and turns the lock mechanism on after switching the on/off of the lock mechanism to a switchable state.

Next, in step S105, it is determined whether or not the current time is a second specified time. If the result of step S105 is "NO", that is to say, if the current time is not a second specified time, the process returns to the same step S105. On the other hand, if the result of step S105 is "YES", that is to say, if the current time is a second specified time, the lock mechanism is turned off in step S107 (unlocked state), and the process returns to step S101. The power supply to the lock mechanism may be stopped in step S107 after the lock mechanism is turned off.

According to the present embodiment, the lock mechanism that prevents consumable items and the like from being detached is turned on when the image forming apparatus 10 is not used, and the consumable items and the like are in a locked state. Therefore, consumable items and the like can be inhibited or prevented from being stolen using a simple configuration.

Furthermore, according to the present embodiment, the on/off of the lock mechanisms is linked with the theft alert mode and the intruder alert mode. Therefore, consumable items and the like can be inhibited or prevented from being stolen more effectively.

Third Embodiment

The image forming apparatus 10 according to the third embodiment is the same as that of the second embodiment, except in that the theft alert mode is sometimes temporarily released, and that the setting conditions and the like relating to the theft alert processing can be changed by the user when the theft alert mode is temporarily released. Therefore, a duplicate description is omitted.

In the third embodiment, the theft alert mode is sometimes temporarily released when a predetermined condition is met. For example, if the current time becomes a preset specified time for a temporary releasing (hereinafter referred to as "third specified time") while the theft alert mode is set, the theft alert mode is temporarily released. Furthermore, if the current time becomes a preset specified time (hereinafter referred to as "fourth specified time") while the theft alert mode is temporarily released, the theft alert mode is restored. That is to say, in the present embodiment, a third specified time represents a time in which the theft alert is temporarily released, and a fourth specified time represents a time in which the theft alert mode is restored.

Note that a third specified time and a fourth specified time can be determined or changed by the user. Although not shown, in a similar manner to the first specified time and the second specified time described above, a third specified time and a fourth specified time may be selected from a pull-down menu, or directly input using software keys by displaying a setting screen on the display 50.

Further, the temporary releasing and restoring of the theft alert mode is not limited to being performed at the specified times described above. For example, when a predetermined user operation (hereinafter referred to as "second operation"), such as a specified key operation or a password input operation exists while the theft alert mode is set, the theft alert mode may be temporarily released.

If the temporary releasing and restoring of the theft alert mode is performed by a specific key operation, at least one of the keys (specified key) among the hardware keys provided on the image forming apparatus 10 or the software keys displayed on the display 50 is assigned the function of temporarily releasing the theft alert mode or restoring the theft alert mode.

If the temporary releasing and restoring of the theft alert mode is performed by a password input operation, a password for temporarily releasing the theft alert mode and for restoring the theft alert mode (releasing/restoring password) is registered in advance.

Further, if a specified key is operated while the theft alert mode is set, or if the password input according to an operation of the touch panel 52 and the operation buttons 86 matches the releasing/restoring password, the theft alert mode is temporarily released.

For example, when the theft alert mode is temporarily released by a specified key operation or a password input operation, the theft alert mode is restored if a specified key operation is performed while the theft alert mode is temporarily released. If the temporary releasing and restoring of the theft alert mode is performed by a specific key operation, the key assigned the function of temporarily releasing the theft alert mode and the key assigned the function of restoring the theft alert mode may be the same key, or may be separate keys.

However, when the temporary releasing and restoring of the theft alert mode is performed by a specific key operation, power is also provided to the specified key in the theft alert mode in addition to the components to which power is supplied in the reduced power mode. Furthermore, when the temporary releasing of the theft alert mod is performed by a password input operation, power is also provided to the touch panel 52 or the operation buttons 86 for accepting input of a password in the theft alert mode in addition to the components to which power is supplied in the reduced power mode.

In addition, even in a case where the theft alert mode is temporarily released, the reduced power mode set in parallel to this is not released. On the other hand, when the theft alert mode is temporarily released, the intruder alert mode may or may not be released.

Furthermore, in the third embodiment, when the theft alert mode is temporarily released, the content of the theft alert processing and the lock processing can be determined or changed by the user.

Figure 12:
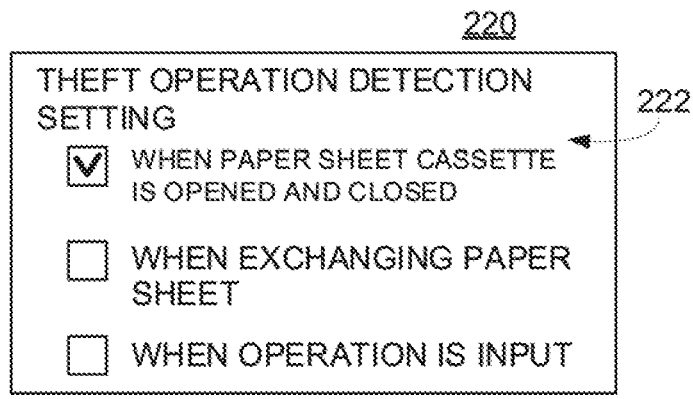
FIG. 12 is a diagram showing an example of a second setting screen according to a third embodiment.

FIG. 12 is a diagram showing an example of a setting screen (second setting screen) 220 for determining or changing the detection conditions of a first operation in the theft alert mode.

Figure 13:
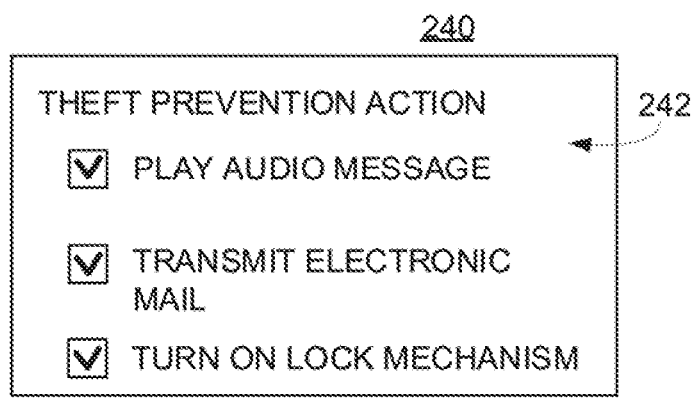
FIG. 13 is a diagram showing an example of a third setting screen according to the third embodiment.

FIG. 13 is a diagram showing an example of a setting screen setting screen) 240 for determining or changing the operation conditions in the theft alert mode.

The second setting screen 220 and the third setting screen 240 are displayed on the display 50 according to a user operation. As shown in FIG. 12, the second setting screen 220 includes a setting area 222. The setting area 222 is an area for setting the detection conditions of a first operation. Among the plurality of operations that be detected as a first operation, the user inserts check marks into the check boxes of those operations that are to be detected as a first operation, and removes check marks from the check boxes of those operations that are not to be detected as a first operation. However, in the initial setting (default), a check mark is placed in all of the check boxes. That is to say, among the plurality of operations that can be detected as a first operation, all of the operations are detected as a first operation.

Furthermore, as shown in FIG. 13, the third setting screen 240 includes a setting area 242. The setting area 242 is an area for setting the operation conditions of the image forming apparatus 10 in the theft alert mode. Among the operations performed by the image forming apparatus 10 when a first operation is detected, the user inserts check marks into the check boxes of those operations that are to be executed in response to detecting a first operation, and removes check marks from the check boxes of those operations that are not to be executed in response to detecting a first operation. However, in the initial setting, a check mark is placed in all of the check boxes. That is to say, among the operations capable of being performed the image forming apparatus 10 when the first operation is detected, all of the operations are executed in response to detecting the first operation.

Hereinafter, the theft alert processing and the lock processing according to the third embodiment will be described using flow charts. However, the same reference symbols are assigned to the same processing as that of the theft alert processing described in the first embodiment, and the lock processing described in the second embodiment. Further, the description of duplicated content will be omitted, or described only briefly.

Figure 14:
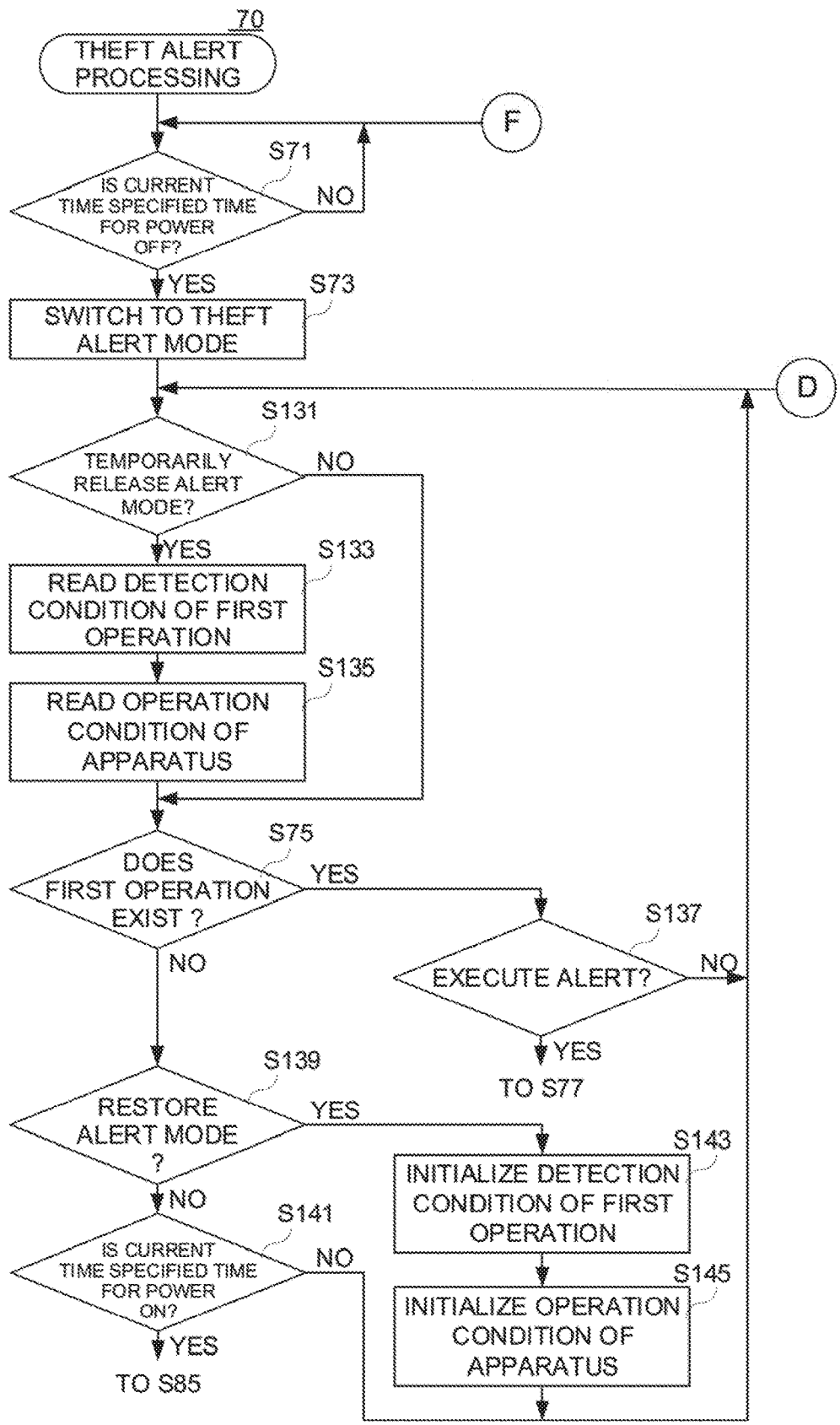
FIG. 14 is a flow chart showing part of an example of theft alert processing performed by the main CPU according to the third embodiment.

FIG. 14 is an example of a flow chart of the theft alert processing performed by the main CPU 70 in the third embodiment. As shown in FIG. 14, when the main CPU 70 starts the theft alert processing, the main CPU 70 switches to the theft alert mode in step S73, and determines in step S131 whether or not the theft alert mode is to be temporarily released. If the result of step S131 is "NO", that is to say, if it is determined that the theft alert mode is not to be temporarily released, the process proceeds to step S75.

On the other hand, if the result of step S131 is "YES", that is to say, if it is determined that the theft alert mode is to be temporarily released, the detection conditions of a first operation in the theft alert mode are read in step S133, and the operation conditions of the image forming apparatus 10 in the theft alert mode are read in step S135. Then, the process proceeds to step S75.

If the result of the following step S75 is "YES", it is determined in step S137 whether or not an alert is to be executed. Here, as the operation conditions of the image forming apparatus 10 in the theft alert mode, it is determined whether or not settings are in place for executing output of the theft alert audio, or transmission of an email that includes a theft alert message. If the result of step S137 is "NO", that is to say, if it is determined that an alert is not to be executed, the process returns to step S131. On the other hand, if the result of step S137 is "YES", that is to say, if it is determined that an alert is to be executed, the process proceeds to step S77. However, when a setting is in place such that output of the theft alert audio not executed, step S77 is omitted. Furthermore, when a setting is in place such that transmission of an email including a theft alert message is not executed, step S81 is omitted.

Moreover, if the result of step S75 is "NO", it is determined in step S139 whether or not the theft alert mode is to be restored. If the result of step S139 is "NO", that is to say, if it is determined that the theft alert mode is not to be restored, it is determined in step S141 whether or not the current time is a second specified time. If the result of step S141 is "YES", the process proceeds to step S85. On the other hand, if the result of step S141 is "NO", the process returns to step S131.

On the other hand, if the result of step S139 is "YES", that is to say, if it is determined that the theft alert mode is to be restored, the detection conditions of a first operation in the theft alert ode are initialized in step S143, and the operation conditions of the image forting apparatus 10 in the theft alert mode are initialized in step S145. Then, the process proceeds to step S131.

Figure 15:
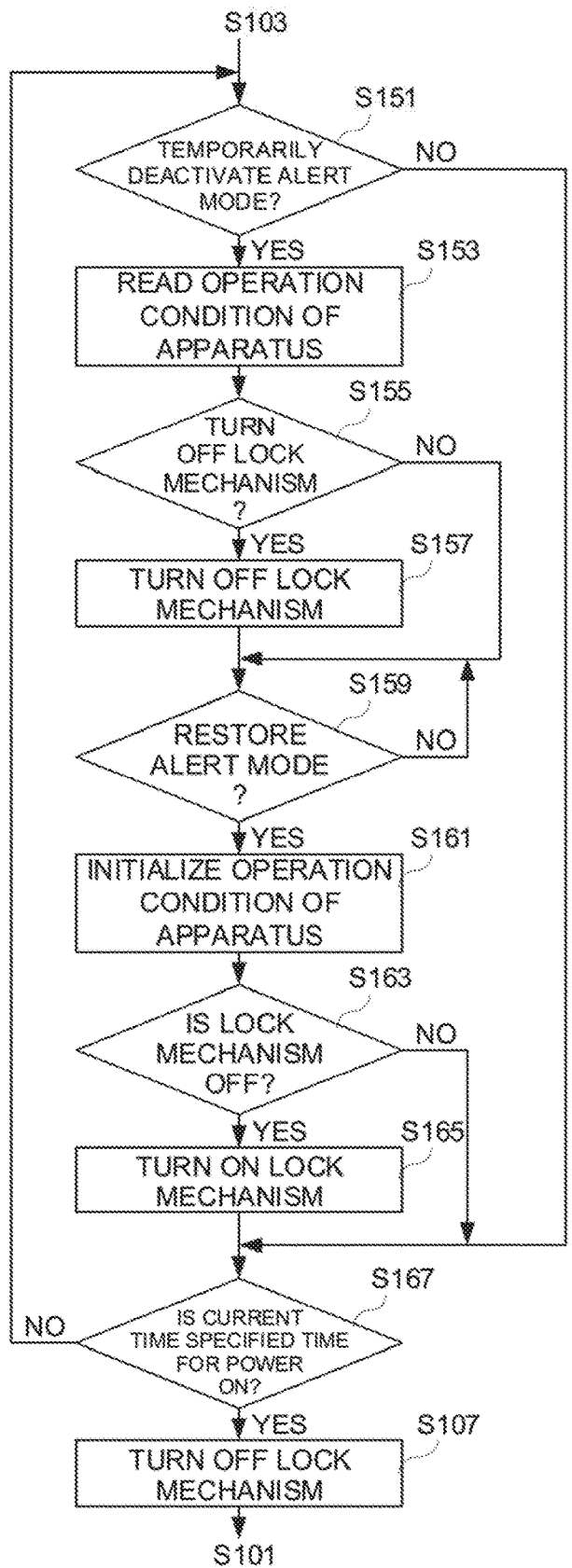
FIG. 15 is a flow chart showing an example of lock processing performed by the main CPU according to the third embodiment.

FIG. 15 is an example of a flow chart of the lock processing performed by the main CPU 70 in the third embodiment. As shown in FIG. 15, when the main CPU 70 starts the lock processing, the main CPU 70 turns on the lock mechanism in step S103, and determines in step S151 whether or not the theft alert mode is to be temporarily released. If the result of step S151 is "NO", that is to say, if it is determined that the theft alert mode is not to be temporarily released, the process proceeds to step S167.

On the other hand, if the result of step S151 is "YES", that is to say, if it is determined that the theft alert mode is to be temporarily released, the operation conditions of the image forming apparatus 10 in the theft alert mode are read in step S153, and it is determined in step S155 whether or not the lock mechanism is to be turned off. Here, as the operation conditions of the image forming apparatus 10 in the theft alert mode, it is determined whether or not a setting is in place to turn off the lock mechanism.

If the result of step S155 is "YES", that is to say if it is determined that the lock mechanism is to be turned off, the lock mechanism is turned off in step S157, and the process proceeds to step S159. On the other hand, if the result of step S155 is "NO", that is to say, if it is determined that the lock mechanism is not to be turned off, the process proceeds to step S159.

Next, in step S159, it is determined whether or not the theft alert mode is to be restored. If the result of step S159 is "NO", that is to say, if it determined that the theft alert mode is not to be restored, the process returns to the same step S159. On the other hand, if the result of step S159 is "YES", that is to say, if it is determined that the theft alert mode is to be restored, the operation conditions of the image forming apparatus 10 in the theft alert mode are initialized in step S161, and it is determined in step S163 whether or not the lock mechanism is off.

If the result of step S163 is "YES", that is to say, if the lock mechanism is off, the lock mechanism is turned on in step S165, and the process proceeds to step S167. On the other hand, if the result of step S163 is "NO", that is to say, if the lock mechanism is on, the process proceeds to step S167.

In step S67, it is determined whether or not the current time is a second specified time. If the result of step S167 is "NO", that is to say, if the current time is not a second specified time, the process returns to step S151. On the other hand, if the result of step S167 is "YES", that is to say, if the current time is a second specified time, the process proceeds to step S107.

According to the present embodiment, the theft alert mode is temporarily released when a predetermined condition is satisfied. Therefore, the user, who knows the method for temporarily releasing the theft alert mode, is capable of temporarily releasing the theft alert mode and using the image forming apparatus 10 even when the theft alert mode is set, which is convenient. On the other hand, a person who does not know the method for releasing the theft alert mode, such as an intruder, is unable to release the theft alert mode. Therefore, the theft alert mode is continued, and consumable items and the like can be inhibited or prevented from being stolen.

Furthermore, according to the present embodiment, when the theft alert mode is temporarily released, the content of the theft alert processing and the lock processing can be determined or changed by the user. Therefore, consumable items and the like can be inhibited or prevented from being stolen while achieving an improvement in convenience.

The specific configurations given in the present specification are merely examples, and can be appropriately changed according to the actual product specifications. For example, the intruder alert processing and the theft alert processing described in the embodiments can be executed in a printing device (image forming unit 12), a fax machine, or a scanner (image reader 14) provided with audio output and email functions, or in an image forming apparatus integrally provided with any two of these devices.

BRIEF DESCRIPTION OF THE REFERENCE SYMBOLS

10 Image forming apparatus
12 Image forming unit
14 Image reader
18 Operation unit
50 Display
52 Touch panel
54 Home button
56 Power saving key
58 Power button
70, 72 central processing unit (CPU)
74, 92 random access memory (RAM)
76 First operation detection sensor
78 Audio integrated circuit (IC)
80 Speaker
82 Power supply control circuit
88 Hard Disk Drive (HDD)
90 Read-only memory (ROM)
94 Modem
96 Network card (NIC)
98 Real-time clock (RTC)

The invention claimed is:

1. An image forming apparatus comprising:
setting circuitry that sets a theft alert mode capable of alerting that there is a concern that at least one of a consumable item used by the image forming apparatus, a unit which is capable of being installed to the image forming apparatus and an additional device which is capable of being installed to the image forming apparatus may be stolen in an unused period in which the image forming apparatus is not used;
an operation detector that detects a predetermined operation that removes, from the image forming apparatus, at least one of the consumable item, the unit and the additional device; and
alert circuitry that alerts that at least one of the consumable item, the unit and the additional device may be stolen when the predetermined operation is detected by the operation detector when the theft alert mode is being set by the setting circuitry.

2. The image forming apparatus according to claim 1, wherein
the alert circuitry that alerts the surroundings of the image forming apparatus that at least one of the consumable item, the unit and the additional device may be stolen, by audio.

3. The image forming apparatus according to claim 1, further comprising
a determination device that determines whether the at least one of the consumable item, the unit and the additional device is locked so as not to be removed when the theft alert mode is being set by the setting circuitry.

4. A non-transitory computer-readable recording medium storing a control program executed by an image forming apparatus, the control program causing a processor of the image forming apparatus to:
set a theft alert mode capable of alerting that there is a concern that at least one of a consumable item used by the image forming apparatus, a unit which is capable of being installed to the image forming apparatus and an additional device which is capable of being installed to the image forming apparatus may be stolen in an unused period in which the image forming apparatus is not used;
detect a predetermined operation that removes, from the image forming apparatus, at least one of the consumable item, the unit and the additional device; and
alert that at least one of the consumable item, the unit and the additional device may be stolen when the predetermined operation is detected in the detecting when the theft alert mode is being set in the setting.

5. A control method executed by a processor of a controller, the control method comprising:
(a) setting, by the processor, a theft alert mode capable of alerting that there is a concern that at least one of a consumable item used by the image forming apparatus, a unit which is capable of being installed to the image forming apparatus and an additional device which is capable of being installed to the image forming apparatus may be stolen in an unused period in which an image forming apparatus is not used;
(b) detecting, by the processor, a predetermined operation that removes, from the image forming apparatus, at least one of the consumable item used by the image forming apparatus, the unit and the additional device; and (c) alerting, by the processor, that at least one of the consumable item, the unit and the additional device may be stolen when the predetermined operation is detected in (b) when the theft alert mode is being set in (a).

* * * * *